(12) United States Patent
Kravchenko et al.

(10) Patent No.: US 12,508,711 B2
(45) Date of Patent: Dec. 30, 2025

(54) ROBOT SYSTEM AND A METHOD FOR MONITORING A ROBOT SYSTEM

(71) Applicant: Universal Robots A/S, Odense (DK)

(72) Inventors: Ievgen Kravchenko, Odense (DK); Kasper Tofte, Odense (DK)

(73) Assignee: Universal Robots A/S, Odense S. (DK)

( * ) Notice: Subject to any disclaimer, the term of this patent is extended or adjusted under 35 U.S.C. 154(b) by 154 days.

(21) Appl. No.: 18/035,555

(22) PCT Filed: Nov. 5, 2021

(86) PCT No.: PCT/DK2021/050327
§ 371 (c)(1),
(2) Date: May 5, 2023

(87) PCT Pub. No.: WO2022/096074
PCT Pub. Date: May 12, 2022

(65) Prior Publication Data
US 2023/0405822 A1    Dec. 21, 2023

(30) Foreign Application Priority Data

Nov. 6, 2020 (DK) .......................... PA 2020 70737

(51) Int. Cl.
*B25J 9/16* (2006.01)
*G05B 19/406* (2006.01)
*G05B 23/02* (2006.01)

(52) U.S. Cl.
CPC ........... *B25J 9/1674* (2013.01); *B25J 9/1633* (2013.01); *B25J 9/1671* (2013.01); *G05B 19/406* (2013.01);
(Continued)

(58) Field of Classification Search
CPC ...... B25J 9/1674; B25J 9/1633; B25J 9/1671; G05B 19/406; G05B 23/0283; G05B 2219/35291
See application file for complete search history.

(56) References Cited

U.S. PATENT DOCUMENTS 4,763,531 A  8/1988 Dietrich et al.
5,510,993 A  4/1996 Williams et al.
(Continued)

FOREIGN PATENT DOCUMENTS

CN  104275693 A  1/2015
DE  102015218697  3/2017
(Continued)

OTHER PUBLICATIONS

International Search Report and Written Opinion received for PCT Patent Application No. PCT/DK2021/050327, mailed on Jan. 19, 2022, 18 pages.
(Continued)

*Primary Examiner* — Wade Miles
*Assistant Examiner* — Jerrod Irvin Davis
(74) *Attorney, Agent, or Firm* — ArentFox Schiff LLP

(57) ABSTRACT

The invention relates to a method for monitoring a robot system comprising a robot arm and a peripheral device, the method comprising the steps of: providing a communicative peripheral connection between the peripheral device and a robot controller; establishing an operation signal history in a digital storage wherein the operation signal history is based on operation representations; executing a robot operation process on the robot controller; establishing a peripheral signal associated with the peripheral connection; recording the peripheral signal to obtain a peripheral signal representation; updating the operation signal history by providing the peripheral signal representation as an operation representa-
(Continued)

tion of the operation representations; and tracking operation of the robot system based on the operation signal history. The invention further relates to a robot system.

51 Claims, 6 Drawing Sheets

(52) U.S. Cl.
CPC .............. *G05B 23/0283* (2013.01); *G05B 2219/35291* (2013.01)

(56) References Cited

U.S. PATENT DOCUMENTS

| | | | |
|---|---|---|---|
| 6,004,019 | A | 12/1999 | Suita et al. |
| 6,466,844 | B1 | 10/2002 | Ikeda et al. |
| 9,592,608 | B1 | 3/2017 | Bingham et al. |
| 10,399,232 | B2 | 9/2019 | Oestergaard et al. |
| D895,704 | S | 9/2020 | Johansen |
| D895,705 | S | 9/2020 | Johansen |
| D898,090 | S | 10/2020 | Johansen |
| 10,850,393 | B2 | 12/2020 | Oestergaard et al. |
| D915,487 | S | 4/2021 | Sell |
| 11,260,543 | B2 | 3/2022 | Johansen |
| 11,474,510 | B2 | 10/2022 | Oestergaard et al. |
| 11,796,045 | B2 | 10/2023 | Johansen |
| 11,839,979 | B2 | 12/2023 | Rosenlund et al. |
| 11,964,389 | B2 | 4/2024 | Johansen |
| 12,011,824 | B2 | 6/2024 | Vraa et al. |
| 2010/0017033 | A1 | 1/2010 | Boca |
| 2013/0079928 | A1 | 3/2013 | Søe-Knudsen et al. |
| 2013/0231778 | A1 | 9/2013 | Oestergaard et al. |
| 2013/0255426 | A1 | 10/2013 | Kassow et al. |
| 2014/0201571 | A1 | 7/2014 | Hosek et al. |
| 2014/0214203 | A1 | 7/2014 | Inoue |
| 2015/0204742 | A1 | 7/2015 | Draisey |
| 2015/0328774 | A1 | 11/2015 | Yajima et al. |
| 2019/0271976 | A1 | 9/2019 | Namikoshi |
| 2019/0294155 | A1 | 9/2019 | Wang |
| 2019/0310620 | A1* | 10/2019 | Kamiguti ............ G06F 11/0766 |
| 2020/0016767 | A1 | 1/2020 | Song |
| 2020/0037522 | A1 | 2/2020 | Dejarnette et al. |
| 2020/0070347 | A1 | 3/2020 | Denenberg et al. |
| 2020/0171658 | A1 | 6/2020 | Kielsholm |
| 2020/0276706 | A1 | 9/2020 | Shah et al. |
| 2021/0086374 | A1 | 3/2021 | Brandt et al. |
| 2021/0173377 | A1* | 6/2021 | Laftchiev ........... G05B 13/0265 |
| 2021/0252698 | A1* | 8/2021 | Paxton ................. G06N 3/045 |
| 2022/0161433 | A1 | 5/2022 | Beck et al. |
| 2022/0184810 | A1 | 6/2022 | Beck et al. |
| 2022/0226993 | A1 | 7/2022 | Madsen |
| 2022/0379463 | A1 | 12/2022 | Hansen |
| 2022/0379468 | A1 | 12/2022 | Hansen |
| 2022/0388156 | A1 | 12/2022 | Hansen |
| 2023/0035296 | A1 | 2/2023 | Søe-Knudsen et al. |
| 2023/0052996 | A1 | 2/2023 | Thomsen |
| 2023/0191603 | A1 | 6/2023 | Thomsen et al. |
| 2023/0311326 | A1* | 10/2023 | Kaspar ................ B25J 9/161 700/245 |
| 2023/0405819 | A1 | 12/2023 | Kravchenko et al. |
| 2023/0405822 | A1 | 12/2023 | Kravchenko et al. |
| 2023/0418258 | A1 | 12/2023 | Mirth |
| 2024/0351209 | A1 | 10/2024 | Graabaek et al. |

FOREIGN PATENT DOCUMENTS

| | | |
|---|---|---|
| EP | 0170705 A1 | 2/1986 |
| EP | 0811451 | 12/1997 |
| EP | 1038640 A2 | 9/2000 |
| EP | 1176486 | 1/2002 |
| PT | 102185 A | 1/2000 |
| WO | 2014/110682 A1 | 7/2014 |
| WO | 2017005272 | 1/2017 |

OTHER PUBLICATIONS

Osrf., "Gazebo : Tutorial : Visualization and logging", Gazebo, XP055642231, Jan. 1, 2014, pp. 1-7.
Wei et al., "RT-ROS: A real-time ROS architecture on multi-core processors" Future Generation Computer Systems/Elsevier Science Publishers Amsterdam, NL, vol. 56, XP029341941, Jun. 9, 2015, pp. 171-178.
File History received for European Patent Application No. 21806644. 7, mailed on Dec. 20, 2024, 164 pages.
File History received for European Patent Application No. 21815101. 7, mailed on Dec. 20, 2024, 181 pages.
Search report and search opinion received for Danish Patent Application No. PA 202070736, mailed on Apr. 22, 2021, 9 pages.
Search Report and search opinion received for Danish Patent Application No. PA 202070737, mailed on Apr. 13, 2021, 9 pages.
Universal Robots., "User Manual UR3/CB3", Version 3.1, Jan. 1, 2009, 181 pages.
International Preliminary Report on Patentability in Application No. PCT/DK2021/050326, dated May 8, 2023, 11 pages.
International Search Report and Written Opinion in Application No. PCT/DK2021/050326 dated Jan. 31, 2022, 14 pages.
Office Action received for European Patent Application No. 21806644. 7, mailed on Jul. 3, 2025, 8 pages.
Office Action and Search Report received for Chinese Patent Application No. 202180075161.5, mailed on Jul. 21, 2025, 17 pages (8 pages of English Translation and 9 pages of Original Document).

* cited by examiner

ROBOT SYSTEM AND A METHOD FOR MONITORING A ROBOT SYSTEM

CROSS-REFERENCE TO RELATED APPLICATIONS

This application is a national stage entry of PCT Application No. PCT/DK2021/050327, which was filed on Nov. 5, 2021. PCT Application No. PCT/DK2021/050327 claims priority to Denmark Patent Application No. PA202070737 which was filed on Nov. 6, 2020. This application claims priority to PCT Application No. PCT/DK2021/050327 and to Denmark Patent Application No. PA202070737. The contents of PCT/DK2021/050327 and Denmark Patent Application No. PA202070737 are incorporated herein by reference.

FIELD OF THE INVENTION

The present invention relates to a robot arm comprising a plurality of robot joints connecting a robot base and a robot tool flange, where a robot controller is configured to control the robot arm in a robot application. Additionally, the present invention relates to monitoring and operating a robot system.

BACKGROUND OF THE INVENTION

Robot arms comprising a plurality of robot joints and links where motors can move part of the robot arm in relation to each other are known in the field of robotics. Typically, the robot arm comprises a robot base which serves as a mounting base for the robot arm; and a robot tool flange where to various tools can be attached. A robot controller is configured to control the robot joints in order to move the robot tool flange in relation to the base. For instance, in order to instruct the robot arm to carry out a number of working instructions. The robot joints may be rotational robot joints configured to rotate parts of the robot arm in relation to each other, prismatic joints configured to translate parts of the robot arm in relation to each other and/or any other kind of robot joints configured to move parts of the robot arm in relation to each other.

Typically, the robot controller is configured to control the robot joints based on a dynamic model of the robot arm, where the dynamic model defines a relationship between the forces acting on the robot arm and the resulting accelerations of the robot arm. Often, the dynamic model comprises a kinematic model of the robot arm, knowledge about inertia of the robot arm and other parameters influencing the movements of the robot arm. The kinematic model defines a relationship between the different parts of the robot arm and may comprise information of the robot arm such as, length, size of the joints and links and can for instance be described by Denavit-Hartenberg parameters or like. The dynamic model makes it possible for the controller to determine which torques the joint motors shall provide in order to move the robot joints for instance at specified velocity, acceleration or in order to hold the robot arm in a static posture.

Typically, it is possible to attach various end effectors to the robot tool flange or other parts of the robot arm, such as grippers, vacuum grippers, magnetic grippers, screwing machines, welding equipment, dispensing systems, visual systems etc.

Typically, robot movement can be programmed relatively precisely. However, a robot often interacts with other objects such as peripheral devices to perform an industrial task. This interaction between several elements is particularly susceptible to errors in operation due to its complexity and since peripheral devices may not have the same precision and accuracy as a robot arm of a robot system.

Often, a robot system does not constantly have a human operator to monitor its operation, and thus errors may occur at a point in time in production in which they cannot be identified. Further, since robots may be required to carry out tasks within a tiny margin of error, a human operator may not be able to identify errors even if he is monitoring the operation.

Some errors may gradually grow during the operation of a robot system, for example if dirt or dust slowly accumulates at joints, robot tools, peripheral devices, a workbench, or a workpiece. That errors might gradually be introduced into operation makes it even more difficult to realize that they occur.

Once some operator realizes that a robot system has been operated erroneously, it can be extremely challenging to pinpoint at what point back in time an error occurred. Such a task may for example involve carefully investigating a large number of workpieces previously handled by the robot system.

Errors may particularly occur subsequent to reprogramming a robot system, including reprogramming the interaction between the robot arm and peripheral devices.

The application US 2015/0328774 A1 discloses a method of controlling a robot system including an articulated robot and a control device. The articulated robot includes links connected by joints, motors configured to drive the joints respectively, and detection devices configured to detect rotation amounts of the joints respectively. The control device controls the motors. The method includes the steps of, by the control device, recording movement information of the joints based on outputs of the detection devices; when detecting an abnormality in the operation of the articulated robot, determining presence or absence of a failure in the articulated robot based on the movement information recorded in at least a period from before detection of the abnormality until detection of the abnormality; and specifying a failure portion of the articulated robot if it is determined that there is a failure in the articulated robot in the step of determining.

SUMMARY OF THE INVENTION

The object of the present invention is to address the above described limitations with the prior art or other problems of the prior art. This is achieved by the method and robot system according to the independent claims where the dependent claims describe possible embodiments of the robot and methods according to the present invention. The advantages and benefits of the present invention are described in the detailed description of the invention.

An aspect of the invention relates to a method for monitoring a robot system comprising a robot arm and a peripheral device, said method comprising the steps of:
  providing a communicative peripheral connection between the peripheral device and a robot controller;
  establishing an operation signal history in a digital storage wherein said operation signal history is based on one or more operation representations; executing a robot operation process on said robot controller;

establishing a peripheral signal associated with said peripheral connection wherein said peripheral signal is linked to said step of executing said robot operation process;

recording said peripheral signal to obtain a peripheral signal representation; updating said operation signal history by providing said peripheral signal representation as an operation representation of said one or more operation representations; and tracking operation of said robot system based on said operation signal history.

The invention can be utilized to test whether a robot operation process works as intended, which is advantageous. For example, if the operation of the robot has been reprogrammed, an operation signal history based on a recorded peripheral signal can be indicative of the efficiency and outcome of the reprogrammed operation.

Some robot systems perform repetitive tasks with minimal supervision. If at some point an error is introduced into such a repetitive task of the robot system while no supervision is occurring, it is challenging at a later point to identify when the error was introduced. Such errors might particularly be introduced by the interplay between the robot arm and peripheral devices working in synchrony with the robot arm.

Establishing an operation signal history onto which peripheral signal representations can be stored as operation representations allows an ongoing recording and storage of the communication between a robot controller and any peripheral devices, which is indicative of the performance of the robot system and of any errors which might have occurred. The invention thus allows improved monitoring for errors which have occurred in the operation of a robot system, which is advantageous.

Often, peripheral signals may be simple binary signals, which are thus easy to record and store. Therefore, particularly focusing on recording peripheral signals may allow a simple implementation of recording, storing, and/or analyzing the operation of the robot system, which is advantageous.

The invention can further be used to facilitate documentation of robot system operation, which is advantageous. This may for example be used to document the quality of any workpieces which the robot system has interacted with in its operation.

The invention may further enable predictive maintenance of a robot system, e.g. by tracking changes in the operation signal history, which may be indicative of degrading of the robot arm and/or peripheral devices.

In some testing scenarios, the robot arm itself may not even have to be operated. Execution of the robot operation process on the robot controller may be execution of software on the robot controller to test that software. The software may be intended to operate the robot arm once testing is complete, but in a testing stage, the robot arm is disabled. Tracking operation of the robot system may in this context be interpreted as tracking a simulated operation of the robot system.

In contrast to conventional robot systems and methods, the invention may permit long-time tracking of peripheral devices and their operation in relation to a robot-operational process. Such tracking may involve comparisons of data from different operation cycles. Further, the invention may advantageously facilitate simulations of actual operation.

An operation signal history may be understood as one or more digitally stored data entities. The operation signal history may for example be saved as one or more data files on the digital storage. Simple examples of a data file types which could be utilized for an the operation signal history are .txt files, .csv files, and .xls, but note that the operation signal history is not limited to these examples.

The link between the peripheral signal and the execution of the robot operation process may be understood as an interdependence of the peripheral signal and the robot operation process. The peripheral signal may for example depend on the robot operation process, or vice versa. For example, the peripheral device is a sensor detecting the position of a workpiece, and the robot arm is arranged to move that workpiece, for example upon a workpiece being detected at a specific location. Or the peripheral device is an indicative light, indicating whether the robot arm is idle or not.

Updating an operation signal history may be understood as editing an already existing operation signal history by adding, e.g. concatenating, a new peripheral signal representation and a new peripheral time stamp. The step of updating may then for example result in the addition of a new subset of operation representations of said one or more operation representations. The step of updating may be performed in combination with the step of establishing a digital storage. The operation signal history may for example be established upon updating it for the first time. The digital storage may for example be based on a local hard disc or a cloud storage. Further, the digital storage may for example receive a peripheral signal representation through a communicative connection with the robot controller, or through a separate communicative connection to a separate device recording the peripheral signal to obtain a peripheral signal representation.

Tracking operation of said robot system may be understood as replaying the operation signal history slow or fast, visualizing the operation signal history, jumping to specific state or time as a step of optimizing code/execution of the robot operation process or as a step of root cause analysis. Tracking operation of the robot system may be performed partially of fully automatically on a programming device, for example a programming device which tracks the operation signal history to identify derivations from an expected operation. Tracking operation of the robot system may further involve interaction with a human operator.

Executing a robot operation process on a robot controller may for example be understood as executing robot operation software on the robot controller, e.g. as operating the robot system controlled by the robot controller. Executing a robot operation process does not necessarily involve physical operation of a robot arm/robot system. For example, executing a robot operation process may be performed to test the robot system, the robot operation process, the robot operation software, and/or the robot controller.

Generally, a peripheral device may be understood as a device external from the robot arm which facilitates interaction with surroundings, such as the workpiece or an operator. The workpiece should be understood as an object handle by the robot arm or the robot system, e.g. to be worked, moved, packed, painted, welded, polished, etc. In typical embodiments, a peripheral device may for example be a conveyor belt, a sensor, a camera, an indicative light or display, a valve, a user input mechanism, an actuator, an auxiliary robot system/arm etc. An example of a user input mechanism is a button which an operator activates, e.g., whenever an application object is ready to be handled by the robot. In some embodiments, a peripheral device is an integrated part of the robot controller. For example, a separate group of cores of the robot controller configured to perform a separate process, such as a control process, such as control of an external device. An example of an integrated peripheral device is a state machine integrated in the robot controller. In other embodiments, peripheral devices are not integrated parts of the robot controller.

A communicative peripheral connection between a peripheral device and a robot controller may for example be a wired connection, or it may be a wireless connection. Such a connection may for example enable the robot controller to control the peripheral device and/or the robot controller may control the robot arm relying on input from the peripheral device through the connection. In various embodiments of the invention, the connection may thus facilitate one- and two-way communication between peripheral device and robot controller. In some embodiments, the connection is, at least partly, facilitated by a programmable logic circuit (PLC). The recording of the peripheral signal may be performed anywhere along the communicative peripheral connection. It may additionally be performed within the peripheral device and within the robot controller.

In an embodiment of the invention, said step of executing said robot operation process is performed to operate said robot system controlled by said robot controller.

In an embodiment of the invention, said step of executing said robot operation process is performed to operate said peripheral device.

Executing the robot operation process to operate the robot arm, the peripheral device, or the robot system is advantageous, since it allows tracking the physical operation of any of these. For example, tracking a single operation cycle, or many operation cycles of a repetitive operation.

In an embodiment of the invention, said step of executing said robot operation process is performed to simulate operation of said robot system controlled by said robot controller.

In an embodiment of the invention, said step of executing said robot operation process is performed to simulate operation of said robot arm controlled by said robot controller.

In an embodiment of the invention, said step of executing said robot operation process is performed to simulate operation of said peripheral device.

Executing the robot operation process to simulate operation of the robot arm, the peripheral device, or the robot system is advantageous, since it allows planning and adjusting future operation of any of these. In such simulated operations, any signals may also be simulated, e.g. a peripheral signal may be simulated.

In an embodiment of the invention, said method comprises a step of subsequently operating said robot system controlled by said robot controller based on said step of tracking operation of said robot system.

By first executing a robot operation process and tracking operation of the robot system, it is possible to evaluate the operation, for example to approve, change, or adjust it for future operations. Thus, subsequently operation the robot system based on tracking of operation of the robot system may ensure improved subsequent operation, which is advantageous.

Subsequently operation the robot system based on the step of tracking operation of the robot system may also be understood as establishing an updated robot operation process based on the tracking operation of the robot system, and executing the updated robot operation process on the robot controller to operate the robot system.

In an embodiment of the invention, said method comprises a step of subsequently reconfiguring any of said peripheral device and said peripheral connection based on said step of tracking operation of said robot system.

By first executing a robot operation process and tracking operation of the robot system, it is possible to evaluate the operation and configuration of a peripheral device. This may in turn allow reconfiguring the peripheral device and/or a peripheral connection to improve the system based on the tracking, which is advantageous. Reconfiguring may for example be understood as reprogramming, replacing, relocating, repairing, reconnecting etc.

In an embodiment of the invention, said step of tracking operation of said robot system comprises processing said operation signal history on a programming device communicatively connected to said digital storage to track former operation of said robot system.

A programming device such as a computer may allow user-friendly and flexible facilitation of tracking operation of the robot system, which is advantageous. The digital storage may be an integrated part of the programming device, it may be separate from the programming device, for example as an external storage device or a cloud storage.

In an embodiment of the invention, said operation signal history is further based on one or more operation time stamps associated with said one or more operation representations, wherein said step of recording said peripheral signal further comprises obtaining a peripheral time stamp associated with said peripheral signal representation,
    wherein said step of updating said operation signal history further comprises updating said operation signal history by providing said peripheral time stamp as an operation time stamp of said one or more operation time stamps.

An operation time stamp may for example allow a user to track when an associated operation representation was recorded. Including operation time stamps in the operation signal history is advantageous, since it allows a user or automated evaluation to perform a more detailed tracking of operation of the robot arm in collaboration with peripheral devices. It may for example allow a user to pinpoint a certain time at which an error was introduced into the operation of the robot system. The time stamps may also assist a user with eventual synchronizing the operation of the various devices in relation to time.

In an embodiment of the invention, said step of recording said peripheral signal is performed via said robot controller.

Recording the peripheral signal via the robot controller advantageously minimizes the number of components required to facilitate the invention, which is advantageous. In particular, this may even permit not using a separate control unit such as a programmable logic circuit for a peripheral device, which is advantageous.

The recording of the peripheral signal via the robot controller may for example be facilitated by having several internal processes within the robot controller. In such cases one of these internal processes may be configured to interact with the peripheral device.

In an embodiment of the invention, said robot arm comprises a plurality of robot joints connecting a robot base to a robot tool flange.

Robot joints connecting to a robot tool flange allows a robot tool to be attached and operated, which is advantageous.

In an embodiment of the invention, said robot controller is a multi-core processor, wherein said communicative peripheral connection is communicating with a first group of cores of said robot controller and any part of said step of executing said robot operation process which is associated with operation of said robot arm is performed on a second group of cores of said robot controller, wherein said first and second groups of cores are separate groups of cores.

In an embodiment of the invention, said first and second groups of cores read and execute program instructions in parallel.

In an embodiment of the invention, said peripheral device is controlled by said first group of cores.

Employing a multi-core processor as a robot controller allows separating tasks of the robot controller which is advantageous. It may for example allow tasks to be executed in parallel to improve execution time and reduce interference between processes.

In an embodiment of the invention, said method further comprises the steps of:
 establishing on said robot controller a virtual state signal indicative of a status of said robot system and linked to said step of executing said robot operation process; and
 recording said virtual state signal to obtain a state signal representation; wherein said step of updating said operation signal history further comprises providing said state signal representation as an operation representation of said one or more operation representations.

In an embodiment of the invention, said virtual state signal is indicative of whether said robot arm is idle.

A virtual state signal is indicative of a status of the robot system. An operation cycle of a robot system may comprise various periods of the robot arm being moved, the robot tool being used, and the robot arm being idle. The robot arm may for example be idle in a period waiting for a new workpiece to be introduced. A virtual state signal may for example be indicative of whether the robot arm is idle or not. The term "virtual" relates to the virtual state signal not necessarily having a dedicated physical input/output on the robot controller which is easily accessible by the user. Instead, in typical embodiments of the invention, the virtual state signal is recorded within the robot controller. It may for example be recorded as a signal among internal processes within the robot controller.

Other examples of state signals may provide indication as to what part of an operation cycle which was being performed at a particular time, such as moving object, grabbing object, moving robot arm without object, interacting with an external device such as a peripheral device, etc.

A state signal may optionally be presented to a human operator in a manner where it is easily interpretable, such as via a Boolean signal indicative of a particular operation, in contrast to e.g. an analogue current of a robot joint which is difficult to interpret.

Recording a virtual state signal is advantageous, since it allows a comparison between a recorded peripheral signal and a recorded virtual state signal, which in combination provides improved tracking of robot system operations.

In an embodiment of the invention, said step of recording said virtual state signal further comprises obtaining an associated state time stamp, wherein said step of updating said operation signal history further comprises providing said state time stamp as an operation time stamp of one or more operation time stamps.

Including a state time stamp as an operation time stamp allows a user or an automated evaluation to perform a more detailed tracking of the state of the robot system, which is advantageous. It may for example allow tracking in combination with a recording of the peripheral signal, to provide a more detailed insight as to how the robot system was operated at a given time in the past.

In an embodiment of the invention, said method further comprises a step of truncating said operation signal history.

In an embodiment of the invention, said step of truncating said operation signal history comprises deleting a subset of said one or more operation time stamps which lies outside a running truncation time window and deleting an associated subset of said one or more operation representations.

Truncating the operation signal history may for example be understood as removing or deleting the oldest entries in the operation signal history. Doing so is advantageous, since it introduces a limitation to the storage space required to store the operation signal history on the digital storage. This is particularly relevant for size-limited digital storages, operation signal histories which has a high time resolution, or operation signal histories comprising data requiring large amounts of storage space such as images or detailed records of robot arm movement/positions.

Entries of the operation signal history or a subset of the operation signal history may for example be deleted based on a running truncation time window, such that entries lying outside that time window or a subset lying outside that time window is deleted. Alternatively, there may be an upper limit to the number of entries in the operation signal history, and entries are deleted such that this upper limit is not surpassed. Or alternatively, there is a maximum amount of storage which the operation signal history may use, and entries are deleted such that this maximum amount is not surpassed.

In an embodiment of the invention, said step of tracking operation of said robot system comprises providing a graphical representation of said operation signal history to a human operator of said robot system.

A graphical representation provides a human operator to gain a quick and/or detailed overview of at least part of the operation signal history. A graphical representation may for example be one or more graphs, or a table of data. It may for example be presented on paper, on a monitor, or via indicative lights, but note that the invention is not restricted to a particular type of medium of representation. A graphical representation may also be based on a data evaluation of the operation signal history. The operation signal history may for example be analyzed, for example automatically, to identify various time ranges of different types of operation. Such different types of operation may for example be indicative of whether the robot arm is idle. Such different types of operation may further be indicative of incorrect/erroneous operation of the robot system or robot arm.

Additionally, or alternatively, a graphical representation may be based on an analysis of the operation signal history. The graphical representation may thus be an analytical representation.

In an embodiment of the invention, said method comprises a step of executing one or more operation cycles, wherein each operation cycle of said one or more operation cycles comprises said step of executing said robot operation process.

In an embodiment of the invention, said step of executing said robot operation process of each of said one or more operation cycles is based on the same robot operation process.

An operation cycle may for example be understood as a task performed repetitively by the robot. Each performed operation cycle may typically be similar, or even identical, but the invention is not limited in this respect. An operation cycle may for example involve the robot arm applying its tool to a workpiece. Another operation cycle will then involve the robot arm applying its tool to another workpiece. Each operation cycle thus involves executing a robot operation process. And the robot operation process of each operation cycle may or may not be the same robot operation process.

Recording a peripheral signal during each operation cycle is advantageous, since this allows a comparison as to how each operation cycle was executed by the robot system.

In an embodiment of the invention, each operation cycle of said one or more operation cycles comprises said step of establishing said peripheral signal.

In an embodiment of the invention, each operation cycle of said one or more operation cycles comprises said step of recording said peripheral signal.

In an embodiment of the invention, each operation cycle of said one or more operation cycles comprises said step of updating said operation signal history.

In an embodiment of the invention, each operation cycle of said one or more operation cycles comprises said step of establishing said virtual state signal.

In an embodiment of the invention, each operation cycle of said one or more operation cycles comprises said step of recoding said virtual state signal.

Recording various data during each operation cycle is advantageous, since it allows an improved comparison between how the different operation cycles was carried out in practice by the robot system.

In an embodiment of the invention, said step of tracking operation of said robot system comprises performing an operation cycle comparison of one operation cycle of said one or more operation cycles with one other operation cycle of said one or more operation cycles.

In an embodiment of the invention, said operation cycle comparison is performed by a programming device identifying differences between:
- a subset of said operation signal history associated with one operation cycle of said one or more operation cycles; and
- a subset of said operation signal history associated with another operation cycle of said one or more operation cycles.

Comparing a subset of the operation signal history relating to one operation with a subset of the operation signal history relating to another operation cycle may improve the probability of identifying deviations in one of the subsets, which is advantageous for identifying errors.

In an embodiment of the invention, said step of tracking operation of said robot system is performed after said step of executing one or more operation cycles.

In an embodiment of the invention, said step of tracking operation of said robot system is performed at least 1 hour after an initial operation cycle of said one or more operation cycles, for example at least 2 hours, for example at least 5 hours, such as at least 10 hours, wherein said initial operation cycle is first in time of said one or more operation cycles.

Tracking the operation of the robot system subsequent to executing operation cycles typically allows a more detailed evaluation than, e.g., a live tracking of the operation, which is advantageous.

In particular, tracking operation of a robot system for several hours may permit identification of slow, gradual changes, which is advantageous.

Further, tracking operation of a robot system for several hours may permit a comparison of operation signal history from several operation cycles.

In an embodiment of the invention, said step of providing said communicative peripheral connection comprises providing a plurality of communicative peripheral connections between a plurality of peripheral devices and said robot controller, wherein said step of establishing said peripheral signal comprises establishing a plurality of peripheral signals respectively associated with said plurality of peripheral connections, wherein said step of recording said peripheral signal comprises recording a plurality of peripheral signals to obtain a plurality of peripheral signal representations respectively associated with said plurality of peripheral signals, wherein said step of updating said operation signal history comprises providing said plurality of peripheral signal representations as a subset of operation representations of said one or more operation representations.

Many modern robot systems involve multiple peripheral devices. Thus, recording the communication between the robot controller and a plurality of peripheral devices may often grant an improved depiction of how the operation of the robot system was carried out in practice, which is advantageous. In particular, having operation representations of several peripheral devices do not only permit tracking each individual peripheral device, but may also permit tracking interplay and interactions between peripheral devices, which is advantageous.

In an embodiment of the invention, said method further comprises a step of performing predictive maintenance of said robot system based on said step of tracking operation of said robot system.

Tracking operation of the robot system may enable a predictive maintenance. Predictive maintenance may for example be understood as monitoring the operation signal history to predict when maintenance may be necessary or advantageous. For example, through tracking changes in the operation signal history which may be indicative of degrading of the robot arm and/or peripheral devices. This may allow maintenance to be performed prior to any breakdown and planning the maintenance strategically to minimize interference with production, which is advantageous.

In an embodiment of the invention, at least one peripheral signal representation of said plurality of peripheral signal representations is a logic signal representation.

Logic signals are advantageous to use in many various contexts, including for control purposes, since they may be simple to interpret. A logic signal may also be understood as a digital signal or a binary signal.

In an embodiment of the invention, said robot controller is configured to control motion of said robot arm by controlling motor torque provided to joint motors of robot joints of said robot arm.

This may for example be as a part of executing the robot operation process. The robot controller may for example be configured to control motion of the robot arm based on a dynamic model of the robot arm, the direction of gravity acting on the robot arm, and/or one or more joint sensor signals.

That the robot controller controls motion of the robot arm may for example be combined with other functionalities relating to an aspect of the invention. For example, the robot controller may simultaneously perform the recording of the peripheral signal In an embodiment of the invention, said method comprises a step of identifying an anomalous peripheral device based on said operation signal history.

The anomalous peripheral device may for example be identified based on identifying an anomalous part of the peripheral signal associated with the peripheral connection of the anomalous peripheral device. An anomalous peripheral device may for example be identified among several peripheral devices of a plurality of peripheral devices.

In an embodiment of the invention, said peripheral signal representation is indicative of a state of said peripheral device.

The peripheral signal representation may for example be a logical signal/Boolean signal. Such a signal is easy to interpret which is advantageous. Particularly given that robot systems may involve complex interactions between many different elements.

An aspect of the invention relates to a robot system comprising:
- a robot arm comprising a plurality of robot joints connecting a robot base to a robot tool flange,
- a robot controller configured to control operation of said robot arm,
- a peripheral device communicatively connected to said robot controller by a peripheral connection, and
- a digital storage comprising an operation signal history, wherein said operation signal history comprises one or more operation representations;
- wherein said robot controller is arranged to record a peripheral signal associated with said peripheral connection to obtain a peripheral signal representation;
- wherein said operation signal history is arranged to receive said peripheral signal representation as an operation representation of said one or more operation representations.

A robot system according to the invention may for example be used to facilitate a method of the invention and may thus have the same or similar advantages.

In an embodiment of the invention, said robot controller is a multi-core processor.

In an embodiment of the invention, said robot controller is communicatively connected to a plurality of peripheral devices by a plurality of respective peripheral connections, wherein said robot controller is arranged to record a plurality of peripheral signals respectively associated with said plurality of peripheral connections to obtain a plurality of peripheral signal representations respectively associated with said plurality of peripheral signals, wherein said operation signal history is arranged to receive said plurality of peripheral signal representations as a subset of operation representations of said one or more operation representations.

In an embodiment of the invention, said robot controller has at least two internal processes, wherein a first process of said at least two internal processes is configured to interact with said peripheral device, wherein a second process of said at least two internal processes is configured to control said robot arm.

In an embodiment of the invention, said robot controller is configured to execute said at least two internal processes.

In an embodiment of the invention, said first process is configured to control operation of said peripheral device.

In an embodiment of the invention, said first process of said robot controller is arranged to record said peripheral signal.

The first internal process may for example be performed on a first group of cores on said robot controller, and the second internal process may for example be performed on a second group of cores on said robot controller. The first and second groups of cores may be separate cores. The robot operation process may correspond to the second process of the at least two internal processes. The first process of the at least two internal processes may also be referred to as an auxiliary operation process or an auxiliary control process.

By performing multiple separate processes on the same robot controller, it is possible to simplify the setup of a robot system. Auxiliary circuitry for monitoring or controlling peripheral devices may be costly, may require expertise, may take up a substantial amount of physical volume, and it may be time-consuming to install. All of these disadvantages may advantageously be avoided by performing multiple separate processes on the robot controller as suggested by embodiments of the invention. Further, it may even speed up execution of operation cycles, since reduced intermediate signal processing is required.

In an embodiment of the invention, said peripheral device is communicatively connected directly to said robot controller by said peripheral connection.

In the context of the present invention, communicatively connected directly may be understood as the communication is directly between the peripheral device and the robot controller i.e. without communicating via an auxiliary circuitry such as a PLC. For example, if a peripheral device is communicatively connected directly to the robot controller, a communicative connection between the peripheral device and the robot controller does not involve auxiliary circuitry, e.g. a PLC.

DETAILED DESCRIPTION OF THE INVENTION

The present invention is described in view of exemplary embodiments only intended to illustrate the principles of the present invention. The skilled person will be able to provide several embodiments within the scope of the claims. Further it is to be understood that in the case that an embodiment comprises a plurality of the same features then only some of the features may be labeled by a reference number.

Figure 1:
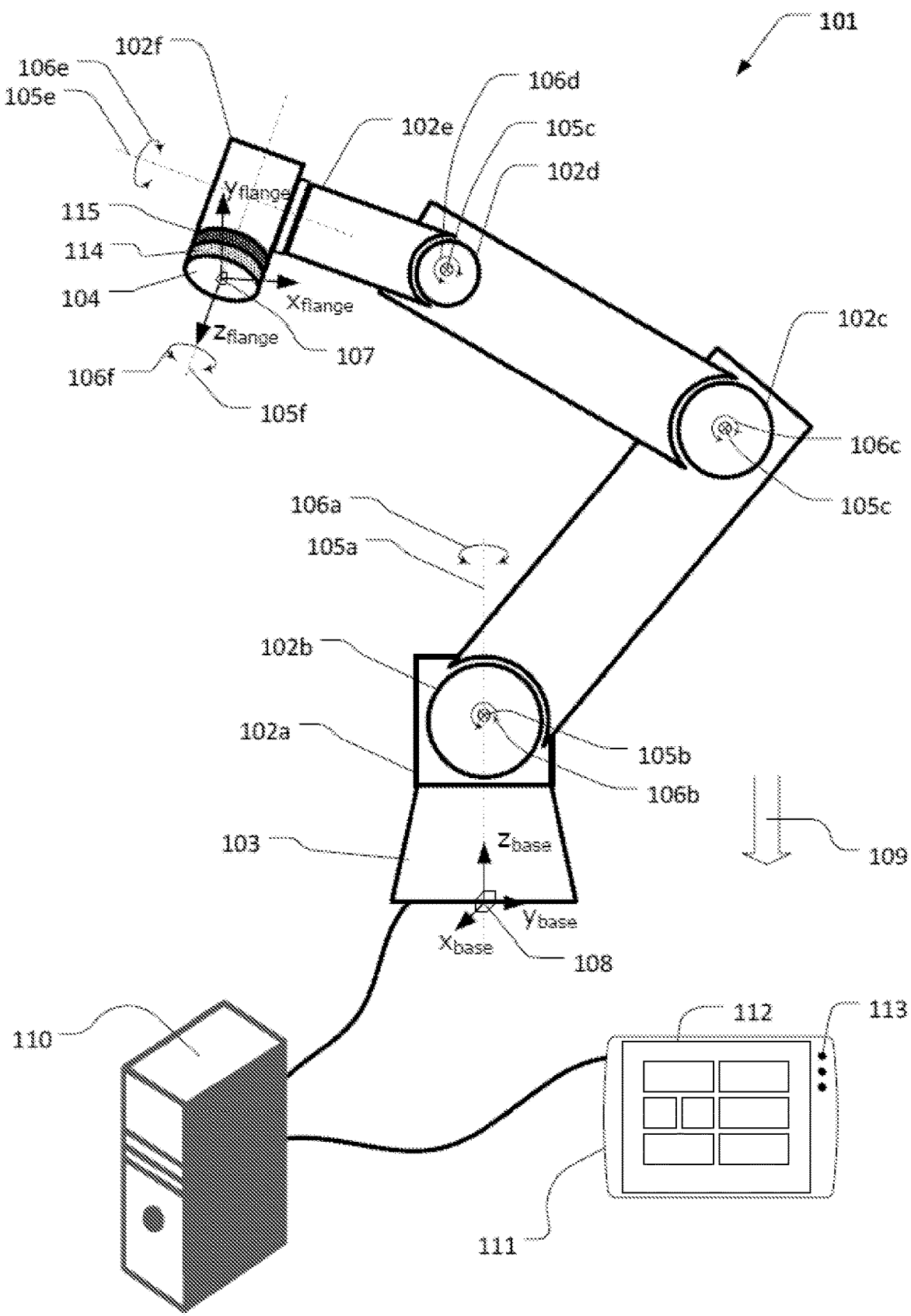
FIG. 1 illustrates a robot arm according to the present invention.

FIG. 1 illustrates a robot arm 101 comprising a plurality of robot joints 102a, 102b, 102c, 102d, 102e, 102f connecting a robot base 103 and a robot tool flange 104. A base joint 102a is configured to rotate the robot arm 101 around a base axis 105a (illustrated by a dashed dotted line) as illustrated by rotation arrow 106a; a shoulder joint 102b is configured to rotate the robot arm around a shoulder axis 105b (illustrated as a cross indicating the axis) as illustrated by rotation arrow 106b; an elbow joint 102c is configured to rotate the robot arm around an elbow axis 105c (illustrated as a cross indicating the axis) as illustrated by rotation arrow 106c, a first wrist joint 102d is configured to rotate the robot arm around a first wrist axis 105d (illustrated as a cross indicating the axis) as illustrated by rotation arrow 106d and a second wrist joint 102e is configured to rotate the robot arm around a second wrist axis 105e (illustrated by a dashed dotted line) as illustrated by rotation arrow 106e. Robot joint 102f is a tool joint comprising the robot tool flange 104, which is rotatable around a tool axis 105f (illustrated by a dashed dotted line) as illustrated by rotation arrow 106f. The illustrated robot arm is thus a six-axis robot arm with six degrees of freedom with six rotational robot joints, however it is noticed that the present invention can be provided in robot arms comprising less or more robot joints and also other types of robot joints such as prismatic robot joints providing a translation of parts of the robot arm for instance a linear translation.

A robot tool flange reference point 107 also known as a TCP is indicated at the robot tool flange and defines the origin of a tool flange coordinate system defining three coordinate axis $x_{flange}$, $y_{flange}$, $z_{flange}$. In the illustrated embodiment the origin of the robot tool flange coordinate system has been arrange on the tool flange axis 105f with one axis ($z_{flange}$) parallel with the tool flange axis and with another axis $x_{flange}$, $y_{flange}$ parallel with the outer surface of the robot tool flange 104. Further a base reference point 108 is coincident with the origin of a robot base coordinate system defining three coordinate axis $x_{base}$, $y_{base}$, $z_{base}$. In the illustrated embodiment the origin of the robot base coordinate system has been arrange on the base axis 105a with one axis ($z_{base}$) parallel with the base axis 105a axis and with another axis $x_{base}$, $y_{base}$ parallel with at the bottom surface of the robot base. The direction of gravity 109 in relation to the robot arm is also indicated by an arrow and it is to be understood the at robot arm can be arrange at any position and orientation in relation to gravity only limited by the freedom of operation of the robot joints.

The robot arm comprises at least one robot controller 110 configured to control robot arm 101 and can be provided as a computer comprising in interface device 111 enabling a user to control and program the robot arm. The controller 110 can be provided as an external device as illustrated in FIG. 1 or as a device integrated into the robot arm or as a combination thereof. The interface device can for instance be provided as a teach pendent as known from the field of industrial robots which can communicate with the controller 110 via wired or wireless communication protocols. The interface device can for instanced comprise a display 112 and a number of input devices 113 such as buttons, sliders, touchpads, joysticks, track balls, gesture recognition devices, keyboards etc. The display may be provided as a touch screen acting both as display and input device. The interface device can also be provided as an external device configured to communicate with the robot controller 110 for instance as smart phones, tablets, PCs, laptops, etc.

The robot tool flange 104 comprises a force-torque sensor 114 (sometimes referred to simply as fore sensor) integrated into the robot tool flange 104. The force-torque sensor 114 provides a tool flange force signal indicating a force-torque provided at the robot tool flange. In the illustrated embodiment the force-torque sensor is integrated into the robot tool flange and is configured to indicate the forces and torques applied to the robot tool flange in relation to the robot tool flange reference point 107. The force sensor 114 provides a force signal indicating a force provided at the tool flange. In the illustrated embodiment the force sensor is integrated into the robot tool flange and is configured to indicate the forces-torque applied to the robot tool flange in relation to the reference point 107 and in the tool flange coordinate system. However, the force-torque sensor can indicate the force-torque applied to the robot tool flange in relation to any point which can be linked to the robot tool flange coordinate system. In one embodiment the force-torque sensor is provided as a six-axis force-torque sensor configured to indicate the forces along and the torques around three perpendicular axes. The force-torque sensor can for instance be provided as any force-torque sensor capable of indicating the forces and torques in relation to a reference point for instance any of the force-torque sensors disclosed by WO2014/110682A1, U.S. Pat. No. 4,763,531, US2015204742. However, it is to be understood that the force sensor in relation to the present invention not necessarily need to be capable of sensing the torque applied to the tool sensor. It is noted that the force-torque sensor may be provided as an external device arranged at the robot tool flange or omitted.

An acceleration sensor 115 is arranged at the robot tool joint 102f and is configured to sense the acceleration of the robot tool joint 102f and/or the acceleration of the robot tool flange 104. The acceleration sensor 115 provides an acceleration signal indicating the acceleration of the robot tool joint 102f and/or the acceleration of the robot tool flange 104. In the illustrated embodiment the acceleration sensor is integrated into the robot tool joint and is configured to indicate accelerations of the robot tool joint in the robot tool coordinate system. However, the acceleration sensor can indicate the acceleration of the robot tool joint in relation to any point which can be linked to the robot tool flange coordinate system. The acceleration sensor can be provided as any accelerometer capable of indicating the accelerations of an object. The acceleration sensor can for instance be provided as an IMU (Inertial Measurement Unit) capable of indicating both linear acceleration and rotational accelerations of an object. It is noted that the acceleration sensor may be provided as an external device arranged at the robot tool flange or omitted.

Each of the robot joints comprises a robot joint body and an output flange rotatable or translatable in relation to the robot joint body and the output flange is connected to a neighbor robot joint either directly or via an arm section as known in the art. The robot joint comprises a joint motor configured to rotate or translate the output flange in relation to the robot joint body, for instance via a gearing or directly connected to the motor shaft. The robot joint body can for instance be formed as a joint housing and the joint motor can be arranged inside the joint housing and the output flange can extend out of the joint housing. Additionally, the robot joint comprises at least one joint sensor providing a sensor signal indicative of at least one of the following parameters: an angular and/or linear position of the output flange, an angular and/or linear position of the motor shaft of the joint motor, a motor current of the joint motor or an external force and/or torque trying to rotate the output flange or motor shaft. For instance, the angular position of the output flange can be indicated by an output encoder such as optical encoders, magnetic encoders which can indicate the angular position of the output flange in relation to the robot joint. Similarly, the angular position of the joint motor shaft can be provided by an input encoder such as optical encoders, magnetic encoders which can indicate the angular position of the motor shaft in relation to the robot joint. It is noted that both output encoders indicating the angular position of the output flange and input encoders indicating the angular position of the motor shaft can be provided, which in embodiments where a gearing have been provided makes it possible to determine a relationship between the input and output side of the gearing. The joint sensor can also be provided as a current sensor indicating the current through the joint motor and thus be used to obtain the torque provided by the motor. For instance, in connection with a multiphase motor, a plurality of current sensors can be provided in order to obtain the current through each of the phases of the multiphase motor. It is also noted that some of the robot joints may comprise a plurality of output flanges rotatable and/or translatable by joint actuators, for instance one of the robot joints may comprise a first output flange rotating/translating a first part of the robot arm in relation to the robot joint and a second output flange rotating/translating a second part of the robot arm in relation to the robot joint.

The robot controller 110 is configured to control the motions of the robot arm and the robot joints by controlling the motor torque provided to the joint motors based on a dynamic model of the robot arm, the direction of gravity acting 109 and the joint sensor signal.

Figure 2:
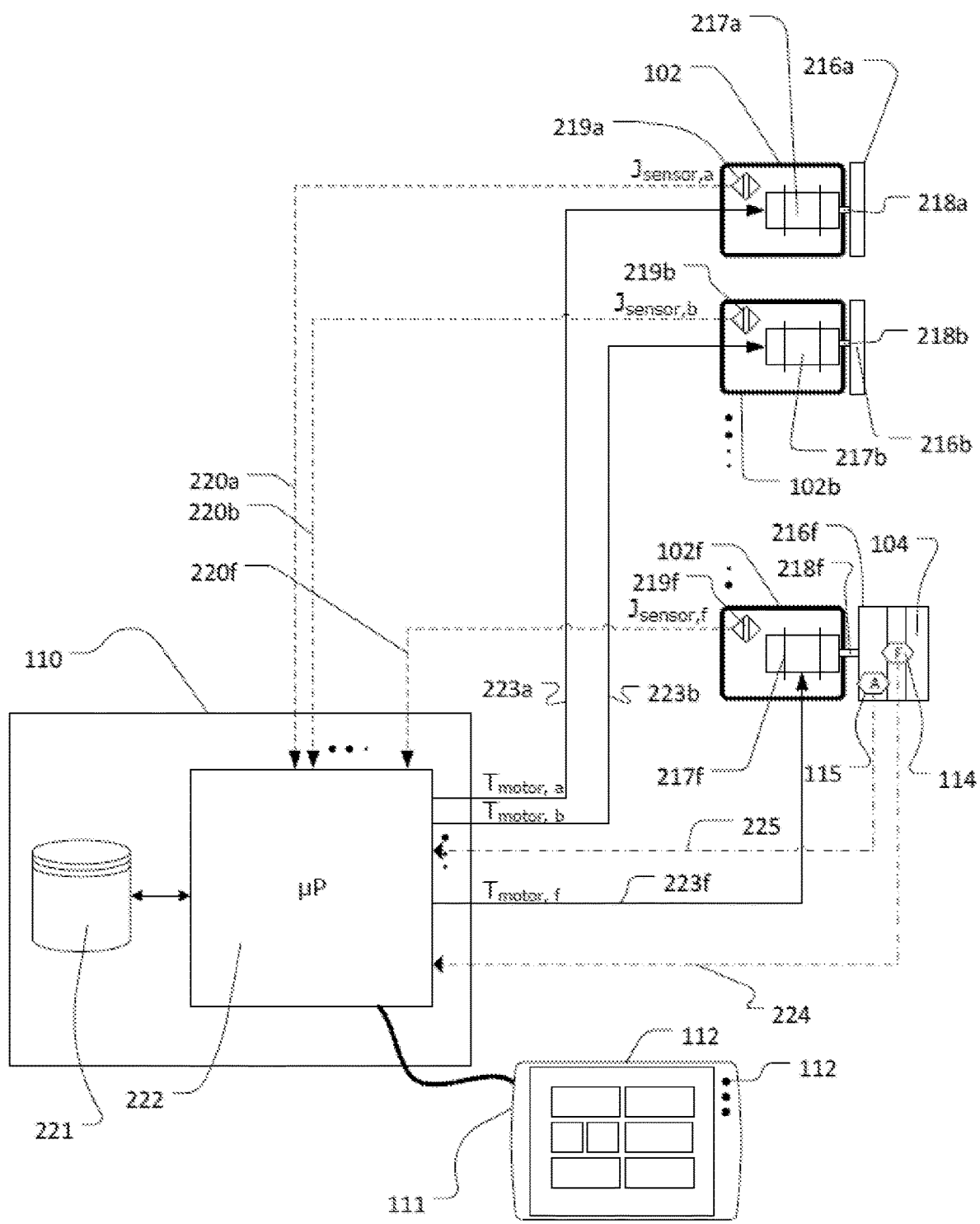
FIG. 2 illustrates a simplified structural diagram of the robot arm and part of the robot controller.

FIG. 2 illustrates a simplified structural diagram of the robot arm 101 illustrated in FIG. 1. The robot joints 102*a*, 102*b* and 102*f* have been illustrated in structural form and the robot joints 102*c*, 102, 102*e* and the robot links connecting the robot joints have been omitted for the sake of simplicity of the drawing. Further the robot joints are illustrated as separate elements however it is to be understood that they are interconnected as illustrated in FIG. 1. The robot joints comprise an output flange 216*a*,216*b*,216*f* and a joint motor 217*a*, 217*b*, 217*f* or another kind of actuator, where the output flange 216*a*,216*b*,216*f* is rotatable in relation to the robot joint body. The joint motors 217*a*, 217*b*, 217*f* are respectively configured to rotate the output flanges 216*a*, 216*b*, 216*f* via an output axle 218*a*, 218*b*, 218*f*. It is to be understood that the joint motor or joint actuator may be configured to rotate the output flange via a transmission system such as a gear (not shown). In this embodiment the output flange 216*f* of the tool joint 123*f* constitutes the tool flange 104. At least one joint sensor 219*a*, 219*b*, 219*f* providing a sensor signal 220*a*, 220*b*, 220*f* indicative of at least one joint sensor parameter $J_{sensor,a}$, $J_{sensor,b}$, $J_{sensor,f}$ of the respective joint. The joint sensor parameter can for instance indicate a pose parameter indicating the position and orientation of the output flange in relation to the robot joint body, an angular position of the output flange, an angular position of a shaft of the joint motor, a motor current of the joint motor. For instance, the angular position of the output flange can be indicated by an output encoder such as optical encoders, magnetic encoders which can indicate the angular position of the output flange in relation to the robot joint. Similar, the angular position of the joint motor shaft can be provided by an input encoder such as optical encoders, magnetic encoders which can indicate the angular position of the motor shaft in relation to the robot joint. The motor currents can be obtained and indicated by current sensors.

The robot controller 110 comprises a processer 220 and memory 221 and is configured to control the joint motors of the robot joints by providing motor control signals 223*a*, 223*b*, 223*f* to the joint motors. The motor control signals 223*a*, 223*b*, 223*f* are indicative of the motor torque $T_{motor,a}$, $T_{motor,b}$ and $T_{motor,f}$ that each joint motor shall provide to the output flanges and the robot controller 110 is configured to determine the motor torque based on a dynamic model of the robot arm as known in the prior art. The dynamic model makes it possible for the controller 110 to calculate which torque the joint motors shall provide to each of the joint motors to make the robot arm perform a desired movement. The dynamic model of the robot arm can be stored in the memory 221 and be adjusted based on the joint sensor parameters $J_{sensor,a}$, $J_{sensor,b}$, $J_{sensor,f}$. For instance, the joint motors can be provided as multiphase electromotors and the robot controller 110 can be configured to adjust the motor torque provided by the joint motors by regulating the current through the phases of the multiphase motors as known in the art of motor regulation.

Robot tool joint 102*f* comprises the force sensor 114 providing a tool flange force signal 224 indicating a force-torque $FT_{flange}$ provided to the tool flange. For instance, the force signal-torque $FT_{flange}$ can be indicated as a force vector $\vec{F}_{sensor}^{flange}$ and a torque vector $\vec{T}_{sensor}^{flange}$ in the robot tool flange coordinate system:

$$\vec{F}_{sensor}^{flange} = \begin{pmatrix} F_{x,sensor}^{flange} \\ F_{y,sensor}^{flange} \\ F_{z,sensor}^{flange} \end{pmatrix} \qquad \text{eq. 1}$$

where $F_{x,sensor}^{flange}$ is the indicated force along the $x_{flange}$ axis, $F_{y,sensor}^{flange}$ is the indicated force along the $y_{flange}$ axis and $F_{z,sensor}^{flange}$ is the indicated force along the $z_{flange}$ axis.

In an embodiment where the force sensor is provided as a combined force-torque sensor the force-torque sensor can additionally also provide a torque signal indicating the torque provide to the tool flange, for instance as a separate signal (not illustrated) or as a part of the force signal. The torque can be indicated as a torque vector in the robot tool flange coordinate system:

$$\vec{T}_{sensor}^{flange} = \begin{pmatrix} T_{x,sensor}^{flange} \\ T_{y,sensor}^{flange} \\ T_{z,sensor}^{flange} \end{pmatrix} \qquad \text{eq. 2}$$

where $T_{x,sensor}^{flange}$ is the indicated torque around the $x_{flange}$ axis, $F_{y,sensor}^{flange}$ is the indicated torque around the $y_{flange}$ axis and $T_{z,sensor}^{flange}$ is the indicated torque around the $z_{flange}$ axis.

Robot tool joint 102*f* comprises the acceleration sensor 115 providing an acceleration signal 225 indicating the acceleration of the robot tool flange where the acceleration may be indicated in relation to the tool flange coordinate system $$\vec{A}_{sensor}^{flange} = \begin{pmatrix} A_{x,sensor}^{flange} \\ A_{y,sensor}^{flange} \\ A_{z,sensor}^{flange} \end{pmatrix}$$

where $A_{x,sensor}^{flange}$ is the sensed acceleration along the $x_{flange}$ axis, $A_{y,sensor}^{flange}$ is the sensed acceleration along the $y_{flange}$ axis and $A_{z,sensor}^{flange}$ is the sensed acceleration along the $z_{flange}$ axis.

In an embodiment where the acceleration sensor is provided as a combined accelerometer/gyrometer (e.g. an IMU) the acceleration sensor can additionally provide an angular acceleration signal indicating the angular acceleration of the output flange in relation to the robot tool flange coordinate system, for instance as a separate signal (not illustrated) or as a part of the acceleration signal. The angular acceleration signal can indicate an angular acceleration vector $\vec{\alpha}_{sensor}^{flange}$ in the robot tool flange coordinate system $$\overrightarrow{\alpha_{sensor}^{flange}} = \begin{pmatrix} \alpha_{x,sensor}^{flange} \\ \alpha_{y,sensor}^{flange} \\ \alpha_{z,sensor}^{flange} \end{pmatrix} \quad \text{eq. 3}$$

where $\alpha_{x,sensor}^{flange}$ is the angular acceleration around the $x_{flange}$ axis, $\alpha_{y,sensor}^{flange}$ is the angular acceleration around the $y_{flange}$ axis and $\alpha_{z,sensor}^{flange}$ is the angular acceleration around the $z_{flange}$ axis.

The force sensor and acceleration sensor of the illustrated embodiment are arranged at the robot tool joint 102f; however, it is to be understood that the force sensor and acceleration sensor can be arrange at any part of the robot arm.

The robot arm illustrated in FIGS. 1 and 2 can for instance be used in a robot system, for instance a robot system according to the present invention.

In an exemplary embodiment of the invention, the robot system comprises two peripheral devices: an object sensor and a conveyer belt. A robot tool is attached to the robot tool flange and is arranged to perform welding of an application object. The object sensor is arranged to detect the presence of an application object at a welding position. The auxiliary control process receives application input signals from the object sensor and the robot control process, upon which logic signals are established. Further, the auxiliary control process provides logic output signals to the conveyer belt and the robot control process based on the logic signals. When no application object is at the welding position, the auxiliary control process is arranged to activate the conveyer belt via a logic output signal. Then, when the object sensor detects an object at the welding position, the auxiliary control process stops the conveyer belt, and initiates movement of the robot arm and welding, via a logic output signal to the robot control process. When welding, as controlled by the robot control process, has completed, movement of the conveyer belt is initiated based on the application input signal from the robot control process. From here, the robot system is ready the receive a new application object via the conveyer belt to repeat the above explained welding process. In this embodiment, the robot controller records peripheral signals on communicative peripheral connections between the robot controller and each of the peripheral devices, and updates an operation signal history accordingly, thus permitting tracking of the robot system.

Figure 3:
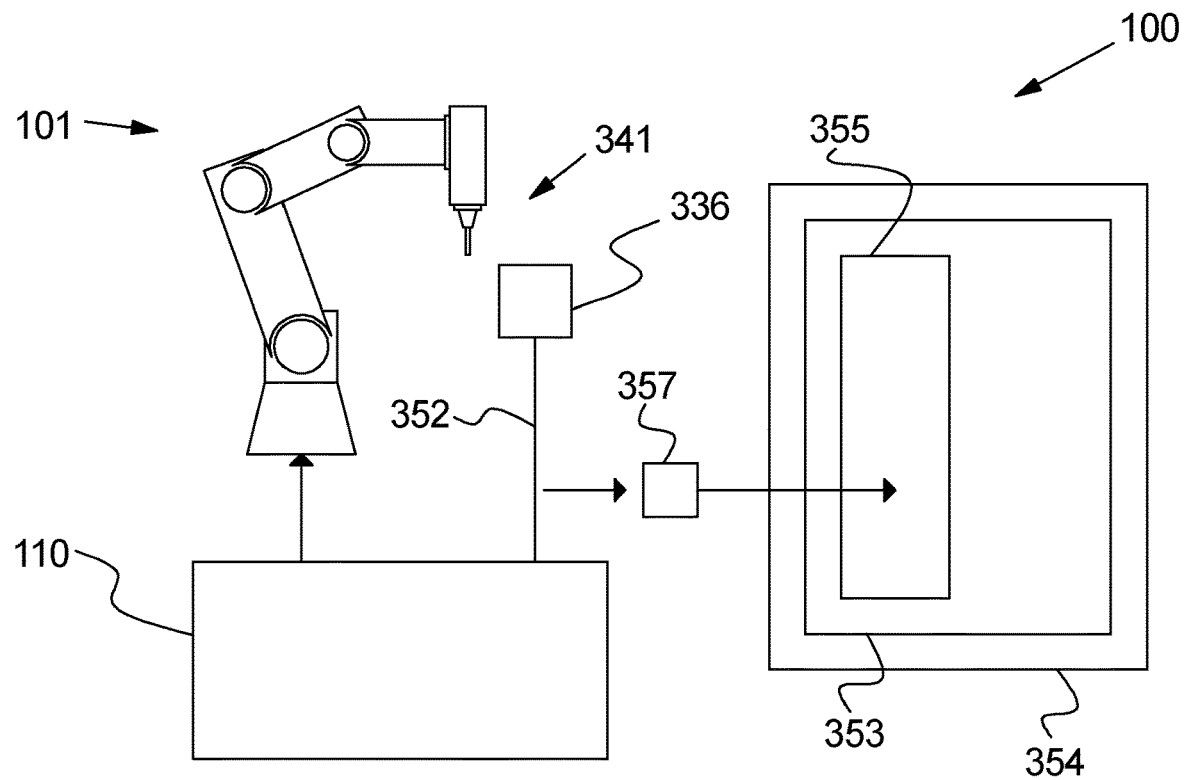
FIG. 3 illustrates an embodiment of the invention.

FIG. 3 illustrates an embodiment of the invention. The robot system 100 comprises a robot arm 101 controlled by a robot controller 110. In addition to the description of motion of the robot arm exemplified above, the robot controller is further communicatively connected to a peripheral device 336 through a peripheral connection 352. This connection may for example be used to perform control of the peripheral device 336 by the robot controller 110, or it may be used as input for the robot controller 110, such that the robot controller operates based on this input. In some embodiments of the invention, the peripheral connection 352 is a two-way communication connection, e.g. such that the peripheral device 336 is controlled based on input by the robot controller 110, and such that the robot controller 110 controls the robot arm 101 based on input by the peripheral device 110. Any communicative signal on the peripheral connection 352, e.g. a signal arranged to perform control, may be understood as a peripheral signal.

The robot system is further associated with a digital storage 354, e.g. a digital storage based on a hard disc or a cloud storage, the digital storage is communicatively connected to the robot controller 110. The digital storage 354 has an operation signal history 353 stored on it. The operation signal history is based on operation representations 355, i.e. it comprises a list of operation representations 355.

The robot system 100 is arranged to be operated based on executing a robot operation process on the robot controller. A robot operation process may for example be a program, software, or code, which the robot controller 110 is able to read/process, and upon this communicate with the robot arm and/or the peripheral device, e.g. to operate any of these.

Upon execution of the robot operation process on the robot controller 110, the robot system 100 is arranged to perform recording of a peripheral signal of the peripheral connection 352 to obtain a peripheral signal representation 357. This may for example be by simply measuring the voltage of the peripheral connection 352. It may also be facilitated by the robot controller 110, for example such that the robot controller provides the peripheral signal representation 357 as an output, e.g. as an output to a programming device or directly to the digital storage 354.

The peripheral signal representation 357 is added to the operation signal history 353 as an operation representation 355, e.g. to extend the number of existing operation representations 355.

Since the peripheral signal representation 357 has been added as an operation representation 355 to the operation signal history 353, it is possible for a user or an automated evaluation to monitor and assess the operation of the robot system 100, particularly the interaction with the peripheral device 336.

In typical embodiments of the invention, peripheral signal representations are continuously stored, e.g. with a certain frequency such as 1 Hz, 1 kHz, or a clock frequency of the robot system, or at key points during an operation cycle.

Figure 4:
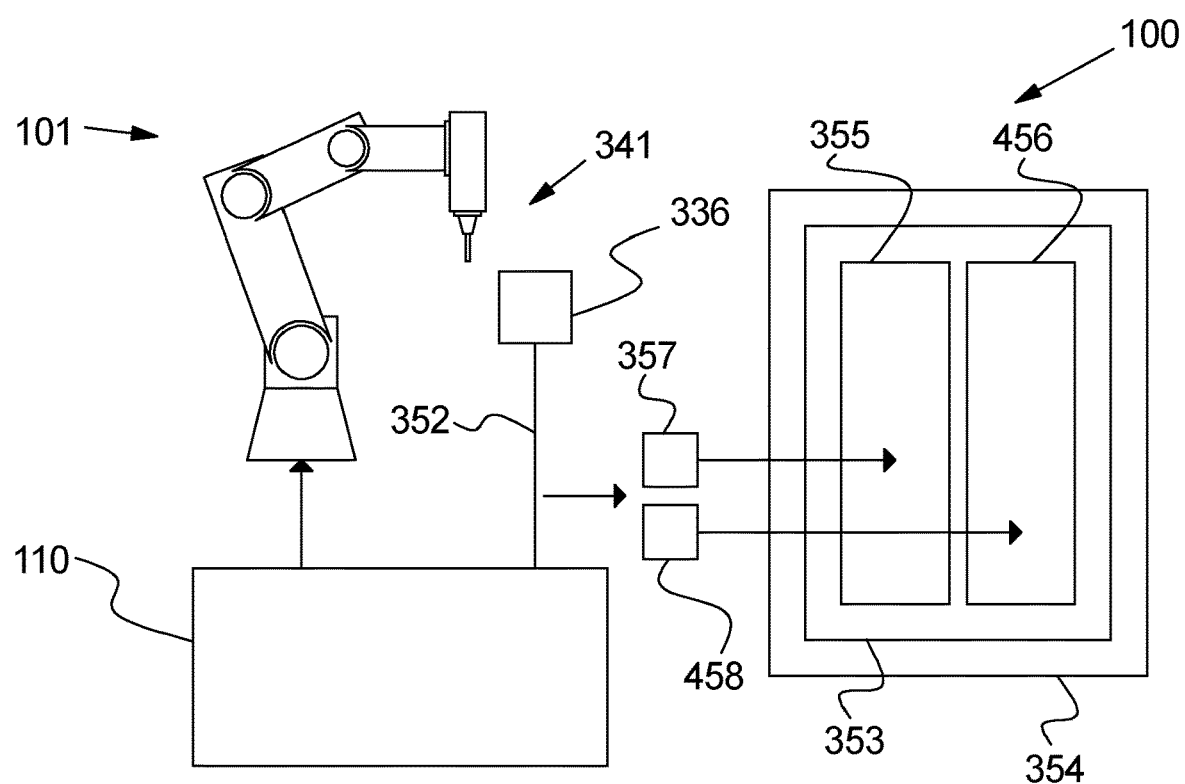
FIG. 4 illustrates an embodiment of the invention arranged to store operation time stamps.

FIG. 4 illustrates an embodiment of the invention arranged to store operation time stamps 456.

The embodiment has a similar structure to the embodiment illustrated in FIG. 3. However, the embodiment illustrated in FIG. 4 is further arranged to store peripheral time stamps 458. The operation signal history 353 is further based on operation time stamps 456, besides being based on operation representations 355. The operation time stamps 456 may for example be associated with the operation representations 355. Thus, an operation time stamp 456 may for example be a data entity which enables pinpointing the time at which an associated operation representation 355 was recorded/stored.

When a peripheral signal is recorded to obtain a peripheral signal representation 357, the system is configured to establish a peripheral time stamp 458 which is associated with that peripheral signal representation 357. This value of the peripheral time stamp 458 may for example be provided by the robot controller 110, or from another time source such as an external time source.

The peripheral time stamp 458 is then added as an operation time stamp 456 to the operation signal history 353.

By storing peripheral signal representations 357 as operation representations 355 and peripheral time stamps 458 as operation time stamps 456, it is possible for a user or an automated evaluation to perform a more detailed assessment of the operation of the robot system. Particularly, it is possible to reconstruct a timeline of operation and possible events, such as an introduction of an error into the operation.

In some embodiments of the invention, each recorded value of a peripheral signal representation 357 has an associated peripheral time stamp 458, whereas in other embodiments, only a subset of recorded values of peripheral signal representations 357 has associated peripheral time stamps 458.

In some embodiments, a user and/or an automated evaluation system will be able to deduce timings of recorded peripheral signal representations/operation representations without operation time stamps. For example, if peripheral signal representations are recorded and stored with a certain frequency, knowledge of this frequency can be used to calculate how much time has passed since a given operation representation was stored.

Figure 5:
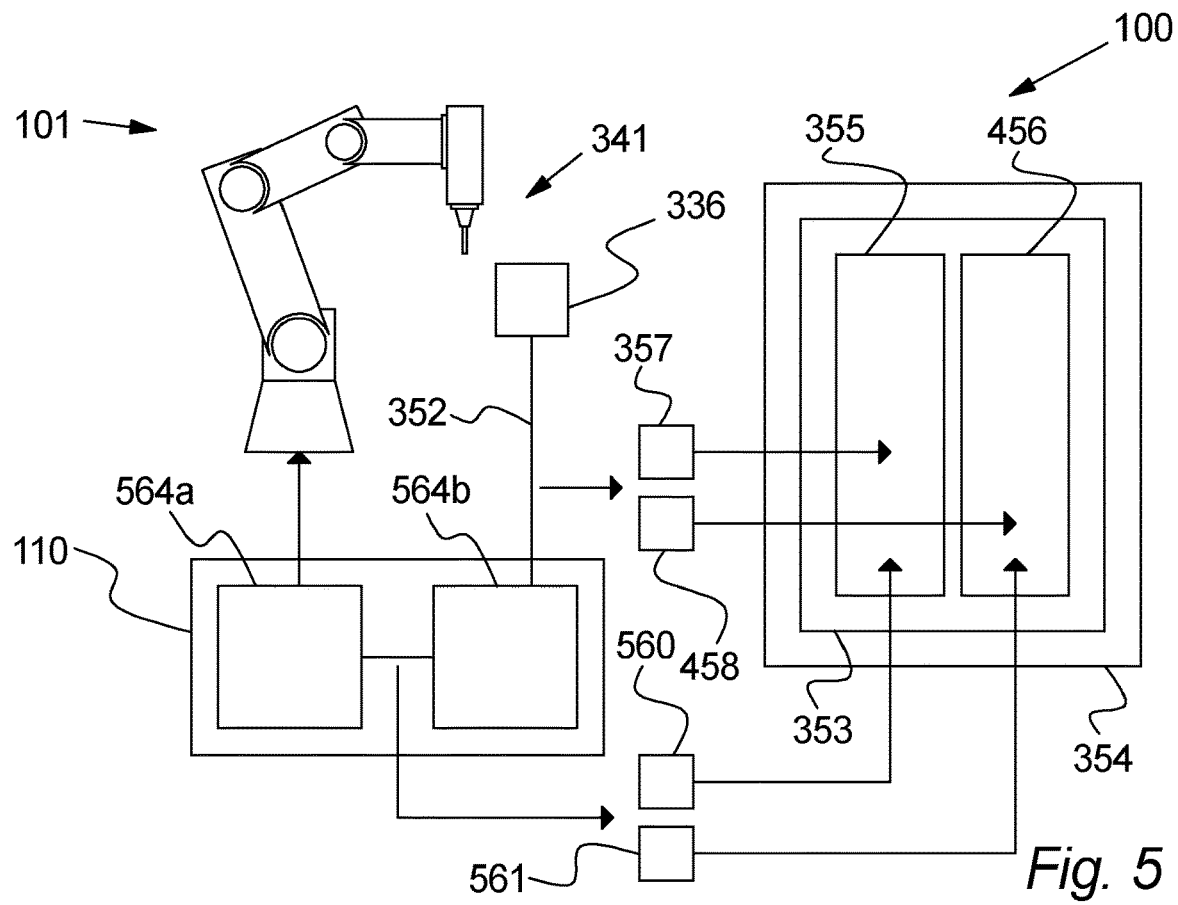
FIG. 5 illustrates an embodiment of the invention arranged to store state signal representations.

FIG. 5 illustrates an embodiment of the invention arranged to store state signal representations 560.

The embodiment has a similar structure is the embodiment illustrated in FIG. 4. However, the embodiment illustrated in FIG. 5 is further arranged to store state signal representations 560 and state time stamps, originating from internal robot controller processes 564*a*, 564*b* of the robot controller 110.

In this embodiment, the robot controller 110 has at least two internal processes 564*a*, 564*b* which are communicatively connected within the robot controller 110. The robot controller 110 may for example be a multi-core processor, and the internal processes 564*a*, 564*b* may be processes respectively executed on separate cores or separate groups of cores of that multi-core processor. In the exemplary embodiment of FIG. 5, one group of cores facilitates an internal process 564*a* which controls the robot arm 101, and one other group of cores facilitates an internal process 564*b* which enables interaction with the peripheral device 336. Any such communication amongst such separate processes 564*a*, 564*b* is facilitated by signals which may be referred to as virtual state signals which may for example be indicative of a state of the robot arm 101, a peripheral device 336, a group of peripheral devices, and/or the robot system 100.

The robot controller 110 is arranged to record the virtual state signal to provide a state signal representation 560. It is further arranged to provide a state time stamp 561 associated with the state signal representation 560. The system is then arranged to provide the state signal representation 560 as an operation representation 355 of the operation signal history 353, and to provide the state time stamp 561 as an operation time stamp 456 of the operation signal history 353.

This allows improved monitoring of the robot system 100, since a recorded peripheral signal representation 357 can be analyzed together with state signal representation 560, as both are stored within the operation signal history 353. Such additional details allow an improved reconstruction of past operations of the robot system.

In some embodiments of the invention, state signal representations 560 and operation representations 355 are stored without storing operation time stamps 456 and state time stamps 561. In some other embodiments of the invention, state signal representations 560 and operation representations 355 are stored while storing one of either operation time stamps 456 or state time stamps 561. For example, the recording and storing of state signal representations 560 and operation representations 355 are at least partly synchronized, such that only storing one type of time stamp is sufficient to backtrack the timing of any of the state signal representations 560 and operation representations 355.

In some other embodiments of the invention, the robot system may be associated with a state machine or a state device, upon which different states of the robot system is associated. During operation of a robot, the robot may cycle through different states of the state machine. Similar operation cycles may typically cycle through similar states of a state machine. The states the robot system cycles through may be saved into the operation signal history as an operation representation.

Figure 6:
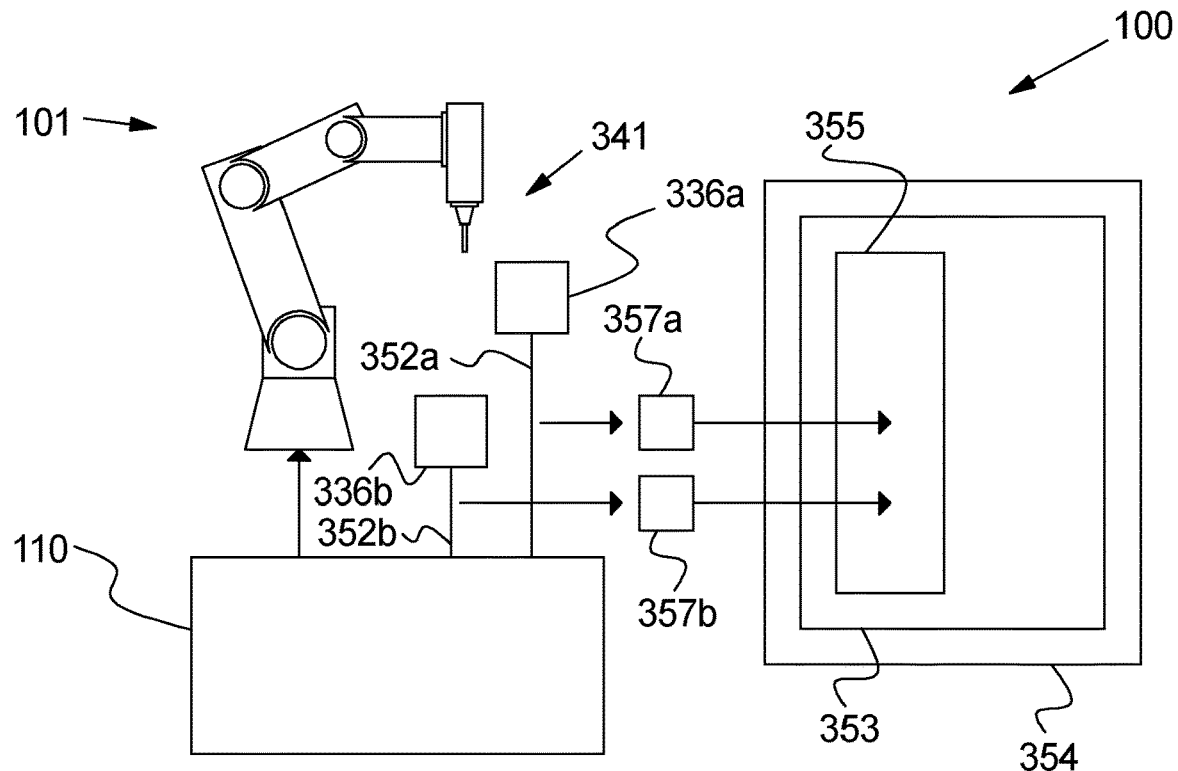
FIG. 6 illustrates an embodiment of the invention arranged to store a plurality of peripheral signal representations.

FIG. 6 illustrates an embodiment of the invention arranged to store a plurality of peripheral signal representations 357*a*, 357*b*. The embodiment has a similar structure to the embodiment illustrated in FIG. 3. However, the embodiment illustrated in FIG. 6 features a plurality of peripheral devices, namely two peripheral devices 336*a* and 336*b*. Each of the peripheral devices 336*a*, 336*b* is connected to the robot controller 110 through a communicative peripheral connection 352*a*, 352*b* having a peripheral signal.

The two peripheral devices may for example be a sensor and a conveyer belt, respectively.

Other embodiments may have at least three peripheral devices, such as at least four peripheral devices, such as at least five peripheral devices, for example six or more peripheral devices.

The robot system 100 is arranged to perform recording of the peripheral signals of both of the peripheral connections 352*a*, 352*b* to obtain a peripheral signal representation 357*a*, 357*b* for each of the peripheral connections 352*a*, 352*b*. These separate peripheral signal representations 357*a*, 357*b* are then provided to the operation signal history 353 as operation representations 355.

The two peripheral signal representations 357*a*, 357*b* may be recorded and provided to the operation signal history in a synchronized process, or the recording and providing of the two representations 357*a*, 357*b* may be desynchronized.

Storing data from multiple communicative lines to peripheral devices 336*a*, 336*b* may give a user or an automated evaluation a more detailed insight into operation of the robot system. For example, into the complex interaction between a robot arm and multiple peripheral devices 336*a*,336*b*.

Figure 7:
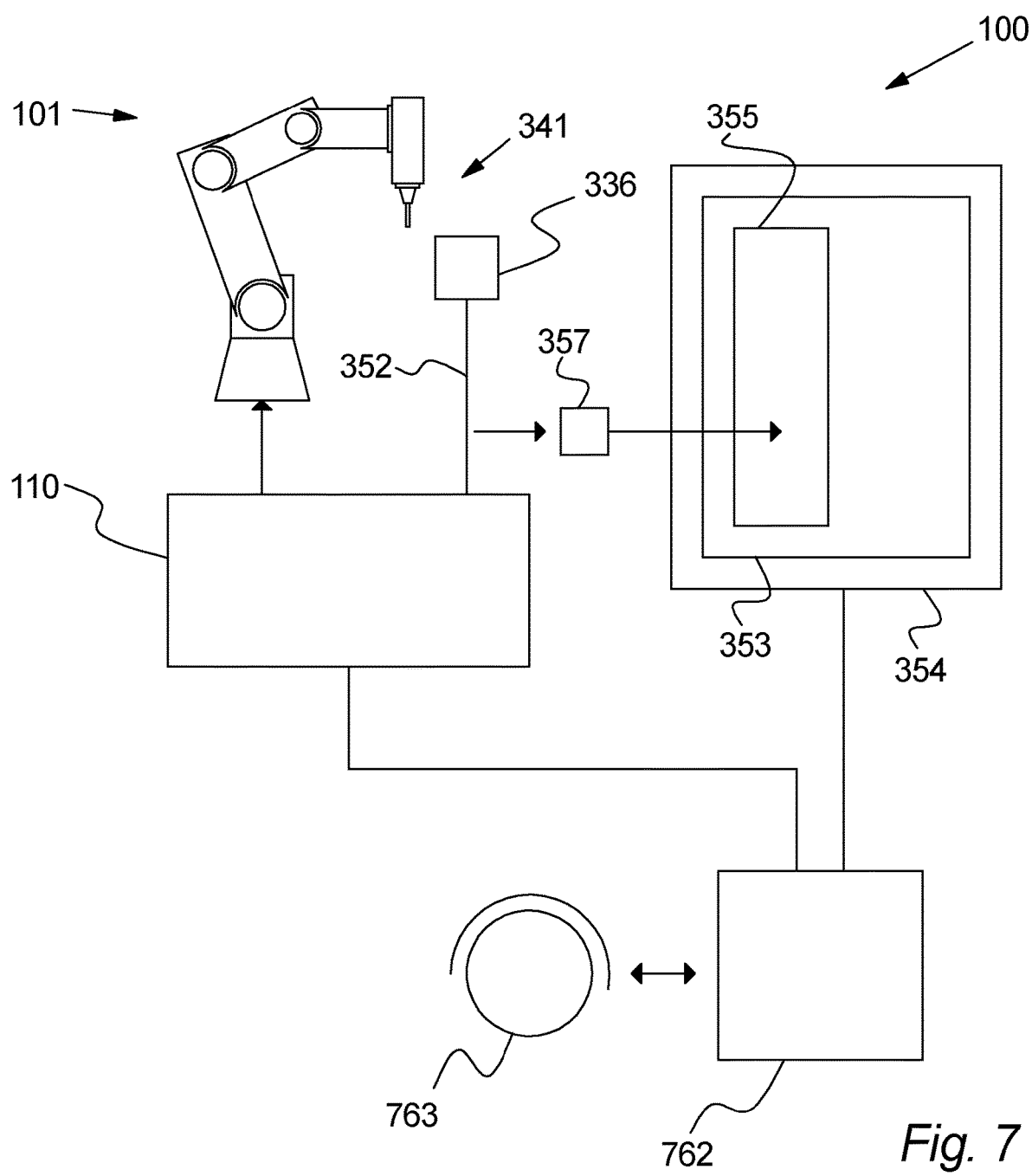
FIG. 7 illustrates an embodiment of the invention arranged to allow interaction with a human operator.

FIG. 7 illustrates an embodiment of the invention arranged to allow interaction with a human operator 763. The embodiment has a similar structure to the embodiment illustrated in FIG. 3. However, in the embodiment illustrated in FIG. 7, the robot controller 110 and the digital storage 354 are both communicatively connected to a programming device 762, which enables interaction with a human operator 763.

The programming device 762 has access to the operation signal history 353. The operation signal history 353, e.g. the operation representations 355 of the operation signal history 353, may thus be evaluated and/or displayed on the programming device 762. The programming device may for example be arranged to perform an automated evaluation of the operation signal history 753.

The operation signal history 353, a visual representation of the operation signal history, an evaluated version of the operation signal history, or an output of an evaluation of the operation signal history may be provided to the human operator 763 via the programming device 762. This allows the human operator 763 to assess the operation of the robot system 100. It further allows the human operator to interact with operation of the robot system via the communicative connection between the programming device 762 and the robot controller 110. This may for example allow the human operator to stop or pause operation. It may further allow the human operator to reconfigure the peripheral device 336 or its connection 352. It may even further allow the human operator to update the robot operation process, which the robot system is operated upon, e.g. to subsequently execute an updated robot operation process based on tracking operation of the robot system. It may additionally allow the human operator to identify whether any errors or inaccuracies has occurred during previous operation of the robot system In some embodiments, the tracking of operation of the robot system 100 including interaction with a human operator 763 is performed while the robot system is being operated. The operation signal history may for example be continuously updated by providing peripheral signal representations. This allows the human operator to track the robot system during its operation. In other embodiments, the tracking of operation of the robot system 100 including interaction with a human operator 763 is performed to track previous operation, e.g. previous operation cycles, of the robot system 100. For example, to track whether an error has occurred within some past interval, for example within the past 8 hours.

Figure 8:
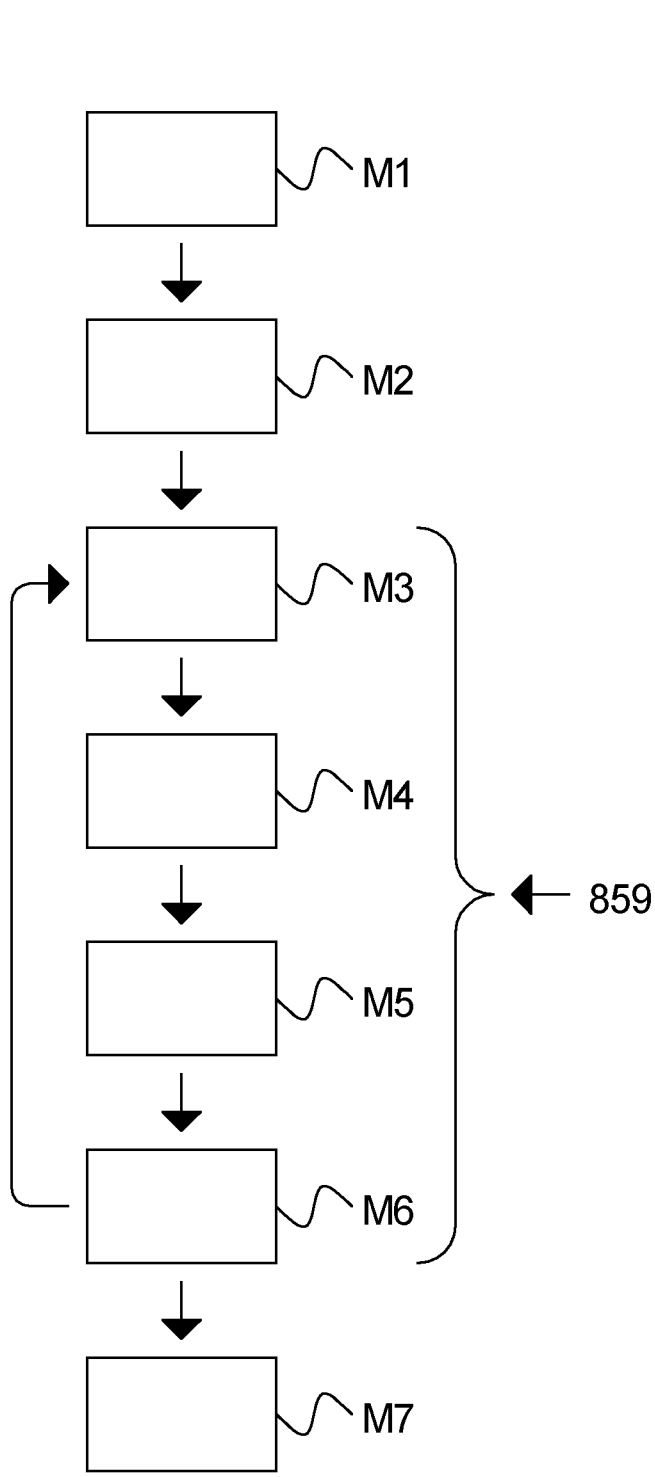
FIG. 8 illustrates a method of the invention having one or more operation cycles.

FIG. 8 illustrates a method for tracking and operating a robot system according to an embodiment of the invention. The method has several steps and is based on one or more operation cycles 859. Other steps may be manual steps of handling the robot arm or peripheral device.

Robot systems and robot arms are sometimes employed to perform tasks/operations which are at least to some degree repetitive. Each repetition of a repetitive task may be referred to as an operation cycle 859. In the illustrated embodiment, four method steps M3-M6 are part of the operation cycle 859.

In a first step of the method M1, a communicative peripheral connection is provided between a peripheral device 336 and a robot controller 110. This connection may for example be provided/established upon installation of the robot system 100, or upon integration of a peripheral device 336 at a later stage.

In a next step of the method M2, an operation signal history 353 is established in a digital storage 354. The operation signal history 353 is based on one or more operations representations 355. The operation signal history 353 may typically be established prior to operating the robot, e.g. by executing a robot operation process. However, in some embodiments of the invention, the operation signal history 353 is established the first time a peripheral signal representation 457 is stored as an operation representation 355. The operation signal history 353 may be established automatically or manually on the digital storage 354.

In a next step of the method M3, a robot operation process is executed on the robot controller. This execution may for example enable operation of the robot system, e.g. of the robot arm 101 and/or one or more peripheral devices 336. The robot operation process may comprise separate internal processes on the robot controller, e.g. a process responsible for controlling the robot arm, and another process responsible for communication with any peripheral devices 336. Such separate processes may typically communicate internally, e.g. using virtual state signals. The execution of a robot operation process may also be performed to test the robot system or simulate operation of the robot system without necessarily operating/moving the robot arm 101. Such a test/simulation may for example show whether software works as intended. Such software may for example be software which the robot operation process is based upon.

In a next step M4, a peripheral signal is established within the peripheral connection 352. The establishment of this peripheral signal is linked to the step of executing the robot operation process, in the sense that the signal is related to the robot operation process. The signal may for example change during the robot operation process, or the robot operation process may depend on the peripheral signal as an input.

In a next step M5, the peripheral signal is recorded to obtain a peripheral signal representation 357. Such a representation may for example be analogue or digital and may be recorded within the robot controller or externally.

In a next step M6, the operation signal history 353 is updated by providing the peripheral signal representation 357 as an operation representation 355. The peripheral signal representation 357 may be communicated to the digital storage 354 through a wired connection, wirelessly, or in a combination of wired and wireless connection.

In this exemplary embodiment, an operation cycle 859 includes the steps of executing a robot operation process M3, establishing a peripheral signal M4, recording the peripheral signal M5, and updating the operation signal history M6. Once these steps have been performed, the robot system facilitating the method may repeat these steps, e.g. to once again execute a robot operation process M3, establish a peripheral signal M4, etc. Such a repetition may be highly similar to any previously performed operation cycle 859. Further, repetitions of operation cycles may be performed any number of times. Each time the operation signal history is updated, more data indicative of the operation of the robot system is added to the operation signal history. Thus, by combining repetitive operation of a robot system with systematic data acquisition and storage, it is possible to track minor changes in operation representation data. Such changes may be indicative of errors or indicate that maintenance is required.

Each operation process may or may not include the same method steps of a previous operation process. In other embodiments, fewer or more steps are included in an operation process.

In a next step M7, the operation of the robot system is tracked based on the operation signal history. This step may for example be performed by providing a visual representation of the operation signal history to a human operator associated with the robot system. The step may also for example be based on an automated evaluation of the operation signal history. Such an automated evaluation may for example be performed by a programming device. The automated evaluation may for example compare operation representations of different operation cycles and/or process data to identify deviations or trends in the data. The step of tracking operation of the robot system M7 may also be performed as part of an operation cycle, for example in combination with an automated evaluation, such that the operation of the robot system can be continuously tracked and monitored.

Figure 9:
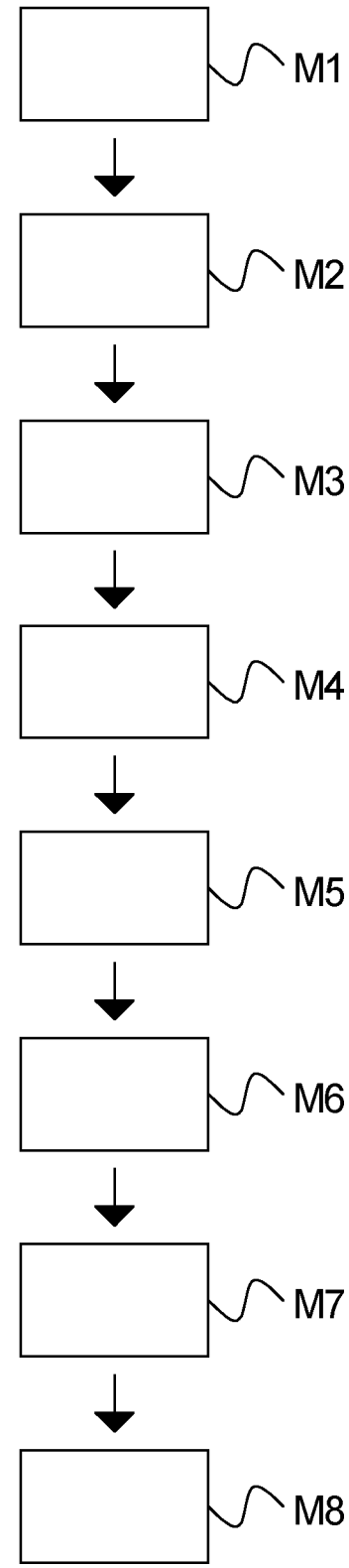
FIG. 9 illustrates a method of the invention involving simulation of operation of the robot system.

FIG. 9 illustrates a method of the invention involving simulation of operation of the robot system 100. Such a simulation can for example be facilitated by the robot controller 110, namely by executing a robot operation process on the robot controller 110. The simulation may be performed using physical equipment, such as the robot controller 110, connections 352 to peripheral devices 336 etc., but may not necessarily include movement of the robot arm 101.

In a first step M1, a communicative peripheral connection 352 is provided between the peripheral device 336 and the robot controller 110.

In a next step M2, an operation signal history 353 is established in a digital storage 354. The operation signal history 353 is comprises on one or more digitally stored operations representations 355.

In a next step M3, a robot operation process is executed on the robot controller 110. This may for example executing software which is arranged to operate the robot arm while movement of the robot arm is disabled. This may further lead to communication with peripheral devices 336 including changing peripheral signals.

In a next step M4, a peripheral signal is established within the peripheral connection 352.

In a next step M5, the peripheral signal is recorded to obtain a peripheral signal representation 357.

In a next step M6, the operation signal history 353 is updated by providing the peripheral signal representation 357 as an operation representation 355.

In a next step M7, the operation of the robot system is tracked based on the operation signal history. This tracking may for example enable an operator to assess whether the robot operation process and/or peripheral devices operate as intended.

In a next step M8, the robot system is subsequently operated based on the previous tracking of the operation of the robot system 100. The step of tracking operation of the robot system M7 has allowed an operator to assess operation of the robot system. If any errors or suboptimal execution is identified, this tracking may in turn allow the operator to either update the robot operation process or to change/reconfigure peripheral devices or their connections. If no errors or suboptimal execution is identified, the robot operator may proceed to subsequently operate the robot system by executing the tracked robot operation process, now knowing that this robot operation process works as intended.

Thus, from the examples of use the robot system of the present invention which is described with respect the FIG. 8 and FIG. 9, the invention may allow a user of the robot system to access previous executions of one or more robot operation processes, for example step by step, or to replay a previous execution. Further, in various embodiments, it is possible to jump to a particular part of the control software and start the execution/replay from that particular part. The user is able to do this e.g. via the display of an interface device. This may for example allow optimization, troubleshooting, and predictive maintenance.

Note that, generally, any of the method steps of the invention may be performed automatically, for example via a computer or processor, such as the robot controller. For example, the method steps of recording the peripheral signal. The step of tracking operation of the robot system may or may not be at least partially automated.

From the above, it is now clear that the invention relates to a robot system and a method for monitoring a robot system. By tapping into a peripheral connection between a robot controller and a peripheral device, it is possible to record a peripheral signal, and use a representation of that signal to update an operation signal history. The stored operation signal history can advantageously be utilized by an automatic evaluation system or a human operator to grant insights into the operation of the robot system to locate errors or to optimize operations.

The invention has been exemplified above with the purpose of illustration rather than limitation with reference to specific examples of methods and robot systems. Details such as a specific method and system structures have been provided in order to understand embodiments of the invention for instance it is to be understood that the embodiments disclosed in the different figures and corresponding description can be combined in any way. Note that detailed descriptions of well-known systems, devices, circuits, and methods have been omitted so as to not obscure the description of the invention with unnecessary details. It should be understood that the invention is not limited to the particular examples described above and a person skilled in the art can also implement the invention in other embodiments without these specific details. As such, the invention may be designed and altered in a multitude of varieties within the scope of the invention as specified in the claims.

BRIEF DESCRIPTION OF FIGURE REFERENCES

| | |
|---|---|
| 100 | robot system |
| 101 | robot arm |
| 102a-102f | robot joint |
| 103 | robot base |
| 104 | robot tool flange |
| 105a-105f | axis of robot joints |
| 106a-106f | rotation arrow of robot joints |
| 107 | robot tool flange reference point |
| 108 | robot base reference point |
| 109 | direction of gravity |
| 110 | robot controller |
| 111 | interface device |
| 112 | display |
| 113 | input devices |
| 114 | force torque sensor |
| 115 | acceleration sensor |
| 216a; 216b; 216f | output flange |
| 217a; 217b; 2179f | joint motors |
| 218a; 218B, 218f | output axle |
| 219a; 219b; 219f | joint sensor |
| 220a-220f | joint sensor signal |
| 221 | memory |
| 222 | processor |
| 223a, 223b, 223f | motor control signals |
| 224 | force signal |
| 225 | acceleration signal |
| 336, 336a, 336b | peripheral device |
| 341 | robot tool |
| 352, 352a, 352b | peripheral connection |
| 353 | operation signal history |
| 354 | digital storage |
| 355 | operation representations |
| 456 | operation time stamps |
| 357, 357a, 357b | peripheral signal representation |
| 458 | peripheral time stamp |
| 859 | operation cycle |
| 560 | state signal representation |
| 561 | state time stamp |
| 762 | programming device |
| 763 | human operator |
| 564a-b | robot controller process |
| M1 | method step of providing a communicative peripheral connection |
| M2 | method step of establishing an operation signal history |
| M3 | method step of executing a robot operation process |
| M4 | method step of establishing a peripheral signal |
| M5 | method step of recording the peripheral signal |
| M6 | method step of updating the operation signal history |
| M7 | method step of tracking operation of the robot system |
| M8 | method step of subsequently operation said robot system |

The invention claimed is:

1. A method for monitoring a robot system comprising a robotic arm and a peripheral device, the method comprising:
saving an operation signal history in digital storage, the operation signal history comprising one or more operation representations, the one or more operation representations being based on operation of the robot system;
executing one or more operation cycles on a controller associated with the robot system, wherein executing each operation cycle comprises executing a respective operation process associated with operation of at least part of the robot system;

recording a peripheral signal associated with a communication between the peripheral device and the controller to obtain a peripheral signal representation, the peripheral signal representation being based on execution of an operation process of the one or more operation cycles;

updating the operation signal history by storing the peripheral signal representation as an operation representation in the digital storage; and monitoring operation of the robot system based on the operation signal history.

2. The method of claim 1, further comprising:
the controller controlling operation of the robot system based on the operation signal history.

3. The method of claim 1, further comprising:
reconfiguring at least one of the peripheral device or a peripheral connection over which the communication occurs based on the operation signal history.

4. The method of claim 1, wherein the operation signal history is based on one or more operation time stamps associated with the one or more operation representations;
wherein recording the peripheral signal comprises obtaining a peripheral time stamp associated with the peripheral signal; and
wherein updating the operation signal history comprises storing the peripheral time stamp in the operation signal history in digital storage.

5. The method of claim 1, wherein recording the peripheral signal is performed by the controller.

6. The method of claim 1, further comprising:
the controller recording a virtual state signal to obtain a state signal representation that is based on the virtual state signal, the virtual state signal being indicative of a status of the robot system;
wherein updating the operation signal history comprises storing the state signal representation in the operation signal history in the digital storage.

7. The method according to claim 6, wherein recording the virtual state signal comprises obtaining a state time stamp associated with the virtual state signal; and
wherein updating the operation signal history comprises storing the state time stamp in the operation signal history in the digital storage.

8. The method of claim 6, wherein the virtual state signal is indicative of whether the robotic arm is idle.

9. The method of claim 1, wherein monitoring operation of the robot system comprises generating a graphical representation of the operation signal history for display on a display device.

10. The method of claim 1, wherein executing the one or more operation cycles comprises: executing a first operation cycle of the one or more operations cycles;
wherein recording the peripheral signal comprises recording a first peripheral signal associated with a communication between the peripheral device and the controller to obtain a first peripheral signal representation that is based on execution of an operation process of the first operation cycle;
wherein updating the operation signal history comprises storing the first peripheral signal representation as an operation representation in the digital storage;
wherein executing the one or more operation cycles further comprises executing a second operation cycle of the one or more operations cycles;
wherein recording the peripheral signal further comprises recording a second peripheral signal associated with a communication between the peripheral device and the controller to obtain a second peripheral signal representation that is based on execution of an operation process of the second operation cycle; and
wherein updating the operation signal history further comprises storing the second peripheral signal representation as an operation representation in the digital storage.

11. The method of claim 10, wherein monitoring operation of the robot system comprises comparing information associated with the first operation cycle with information associated with the second operation cycle.

12. The method of claim 11, wherein the comparing is performed using a programming device to identify one or more differences between:
a subset of the operation signal history associated with the first operation cycle; and
a subset of the operation signal history associated with the second operation cycle.

13. The method of claim 1, wherein monitoring operation of the robot system is performed at least 1 hour, at least 2 hours, at least 5 hours, or, at least 10 hours after an initial operation cycle of the one or more operation cycles, the initial operation cycle being first in time of the one or more operation cycles.

14. The method of claim 1, further comprising:
establishing a communicative peripheral connection over which the communication between the peripheral device and the controller occurs, where establishing the communicative peripheral connection comprises establishing a plurality of communicative peripheral connections between a plurality of peripheral devices including the peripheral device and the controller, where recording the peripheral signal comprises recording a plurality of peripheral signals including the peripheral signal to obtain a plurality of peripheral signal representations respectively associated with the plurality of peripheral signals, and where updating the operation signal history comprises storing the plurality of peripheral signal representations as a subset of operation representations in the operation signal history in the digital storage.

15. The method of claim 1, further comprising:
performing predictive maintenance on the robot system based on monitoring the operation of the robot system.

16. The method of claim 1, wherein the robot controller is configured to control motion of the robotic arm by controlling motor torque provided to motors of joints included in the robotic arm.

17. The of claim 1, further comprising:
identifying that the peripheral device is anomalous based on the operation signal history.

18. The method of claim 1, wherein the peripheral signal representation is indicative of a state of the peripheral device.

19. The method of claim 1, wherein executing the operation process is performed by the controller to operate at least part of the robot system.

20. The method of claim 1, wherein executing the operation process is performed by the controller to operate the robotic arm.

21. The method of claim 1 wherein executing the operation process is performed to operate the peripheral device.

22. The method of claim 1, wherein executing an operation process of the one or more execution cycles simulates operation of at least part of the robot system.

23. The method of claim 1, wherein executing the operation process is performed to simulate operation of the robotic arm.

24. The method of claim 1, wherein executing the operation process is performed to simulate operation of the peripheral device.

25. The method of claim 1, wherein monitoring the operation of the robot system comprises processing the operation signal history on a programming device communicatively connected to the digital storage to obtain former operational information about of the robot system.

26. The method of claim 1, wherein the robotic arm comprises robot joints connecting a base to and a tool flange.

27. The method of claim 1, further comprising:
establishing a communicative peripheral connection over which the communication between the peripheral device and the controller occurs;
wherein the controller comprises a multi-core processor comprising a first group of cores and a second group of cores that is different from the first group of cores, and wherein the communicative peripheral connection is for communication between the first group of cores and a part of the operation process executing on the second group of cores.

28. The method of claim 27, wherein the first group of cores and the second group of cores read and execute program instructions in parallel.

29. The method of claim 1, further comprising:
truncating the operation signal history.

30. The method of claim 1, wherein the one or more operation cycles comprise multiple operation cycles; and
wherein each of the multiple operation cycles is associated with a same operation process.

31. The method of claim 1, wherein the one or more operation cycles comprise multiple operation cycles; and
wherein a peripheral signal associated with a communication between a peripheral device and the controller is obtained for each of the multiple operation cycles.

32. The method of claim 1, wherein the one or more operation cycles comprise multiple operation cycles; and
wherein a peripheral signal associated with a communication between a peripheral device and the controller is recorded for each of the multiple operation cycles.

33. The method of claim 1, wherein the one or more operation cycles comprise multiple operation cycles; and
wherein the operation signal history is updated for each of the multiple operation cycles.

34. The method of claim 1, wherein the one or more operation cycles comprise multiple operation cycles; and
wherein a virtual state signal is obtained for each of the multiple operation cycles, the virtual state signal being indicative of a status of the robot system.

35. The method of claim 34, wherein a corresponding virtual state signal is recorded for each of the multiple operation cycles.

36. The method of claim 1, wherein operation of the robot system is monitored for each of the one or more operation cycles.

37. The method of claim 1, wherein the peripheral signal representation comprises a logic signal representation.

38. The method of claim 1, wherein each operation cycle comprises one or more tasks that the robot performs.

39. The method of claim 38, wherein each operation cycle comprises tasks that the robot performs repetitively.

40. The method of claim 1, wherein the operation process is implemented as robot operation software.

41. A system comprising:
a robotic arm comprising joints connecting a base and a tool flange;
a controller configured to control operation of the robotic arm, the controller being configured to execute one or more operation cycles, wherein executing each operation cycle comprises executing a respective operation process associated with operation of at least part of the robotic arm;
a peripheral device communicatively connected to the controller; and
digital storage storing an operation signal history;
wherein the operation signal history comprises one or more operation representations, the one or more operation representations being based on operation of the system;
wherein the controller is configured to record a peripheral signal associated with a communication between the peripheral device and the controller to obtain a peripheral signal representation that is based on execution of an operation process of the one or more operation cycles; and
wherein the controller is configured to update the operation signal history by storing the peripheral signal representation in the digital storage as an operation representation.

42. The system of claim 41, wherein the controller is configured to execute at least two operation cycles each comprising an operation process, wherein a first process of the at least two operation cycles is configured to interact with the peripheral device, and wherein a second process of the at least two operation cycles is configured to control the robotic arm.

43. The system of claim 42, wherein the controller is configured to execute the at least two operation cycles in parallel.

44. The system of claim 42, wherein the first process is configured to control operation of the peripheral device.

45. The system of claim 42, wherein the first process is configured to record the peripheral signal.

46. The system of claim 41, wherein the controller comprises a multi-core processor.

47. The system of claim 41, wherein the peripheral device is communicatively connected directly to the controller by a peripheral connection.

48. The system of claim 41, further comprising:
a plurality of peripheral connections over which the controller is communicatively connected to a plurality of respective peripheral devices including the peripheral device;
wherein the controller is configured to record a plurality of peripheral signals respectively associated with the plurality of peripheral connections to obtain a plurality of peripheral signal representations; and
wherein the controller is configured to store the peripheral signal representations in the operation signal history in the digital storage.

49. The system of claim 41, wherein each operation cycle comprises one or more tasks that the robot is to perform.

50. The system of claim 49, wherein each operation cycle comprises tasks that the robot is to perform repetitively.

51. The system of claim 41, wherein the operation process is implemented as robot operation software.

* * * * *